(12) United States Patent
Marcu et al.

(10) Patent No.: US 11,169,736 B2
(45) Date of Patent: Nov. 9, 2021

(54) DATA STORAGE DEVICE EQUIPPED TO REDUCE PAGE FAULTS IN HOST DEVICE

(71) Applicant: Western Digital Technologies, Inc., San Jose, CA (US)

(72) Inventors: Alon Marcu, Tel-Mond (IL); Judah Gamliel Hahn, Ofra (IL); Shay Benisty, Beer Sheva (IL)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 230 days.

(21) Appl. No.: 16/141,906

(22) Filed: Sep. 25, 2018

(65) Prior Publication Data

US 2020/0097216 A1 Mar. 26, 2020

(51) Int. Cl.
*G06F 3/06* (2006.01)
*G06F 12/10* (2016.01)

(52) U.S. Cl.
CPC .......... *G06F 3/0659* (2013.01); *G06F 3/0604* (2013.01); *G06F 3/0631* (2013.01); *G06F 12/10* (2013.01); *G06F 2212/1032* (2013.01); *G06F 2212/657* (2013.01)

(58) Field of Classification Search
CPC ...... G06F 3/0659; G06F 3/0604; G06F 12/10; G06F 3/0631; G06F 2212/657; G06F 2212/1032; G06F 3/064; G06F 3/0611; G06F 3/0679; G06F 2212/651; G06F 12/109; G06F 2212/151; G06F 2212/217; G06F 2212/1024; G06F 12/08; G06F 2212/7201; G06F 2212/7208; G06F 12/0246
See application file for complete search history.

(56) References Cited

U.S. PATENT DOCUMENTS 9,355,023 B2 * 5/2016 Badam ................ G06F 12/0246
10,671,309 B1 * 6/2020 Glynn .................. G06F 3/0647
(Continued)

OTHER PUBLICATIONS

NVM Express; "Non-Volatile Memory Express" Revision 1.3a, dated Oct. 24, 2017; 287 pages.
(Continued)

*Primary Examiner* — Charles Rones
*Assistant Examiner* — Tong B. Vo
(74) *Attorney, Agent, or Firm* — Loza & Loza, LLP; Gabriel Fitch

(57) ABSTRACT

The disclosure relates in some aspects to a controller of a data storage device, such as the controller of a solid state device (SSD) having non-volatile memory (NVM). In some aspects, the controller operates to prevent or reduce page faults in the host device. In one example, an outer mapping table of a set of page tables of a host device stores pointers to an inner mapping table in the SSD controller. The pointers are provided within memory access requests sent from the host to the SSD. The inner table maps the pointers to physical addresses in the SSD. The SSD detects page faults by identifying pointers that do not have corresponding entries in the inner table. The SSD allocates physical addresses to accommodate such access requests, then executes the requests on behalf of the host device. In this manner, the page fault is transparent to the host.

25 Claims, 15 Drawing Sheets

(56) References Cited

U.S. PATENT DOCUMENTS

| | | | | |
|---|---|---|---|---|
| 2010/0332727 | A1* | 12/2010 | Kapil | G06F 12/08 |
| | | | | 711/103 |
| 2016/0077761 | A1* | 3/2016 | Stabrawa | G06F 3/067 |
| | | | | 711/172 |
| 2016/0179564 | A1* | 6/2016 | Chen | G06F 12/109 |
| | | | | 718/1 |
| 2017/0160991 | A1* | 6/2017 | Choi | G06F 3/0653 |
| 2018/0024938 | A1* | 1/2018 | Paltashev | G06F 12/1027 |
| | | | | 711/133 |
| 2018/0260323 | A1* | 9/2018 | John | G06F 12/0223 |
| 2019/0171397 | A1* | 6/2019 | Patel | G06F 3/0649 |
| 2019/0266099 | A1* | 8/2019 | Tsirkin | G06F 12/1009 |
| 2020/0089430 | A1* | 3/2020 | Kanno | G06F 11/0751 |
| 2020/0218451 | A1* | 7/2020 | Hashimoto | G06F 3/0688 |

OTHER PUBLICATIONS

Wikipedia, "Page Fault"; retrieved Sep. 25, 2018; 3 pages; https://en.wikipedia.org/wiki/Page_fault.

* cited by examiner

DATA STORAGE DEVICE EQUIPPED TO REDUCE PAGE FAULTS IN HOST DEVICE

FIELD

The disclosure relates, in some embodiments, to data storage devices, such as solid state devices that employ controllers to access non-volatile memory arrays. More specifically, but not exclusively, the disclosure relates to the handling of memory access page faults.

INTRODUCTION

Data storage devices or apparatus include solid state devices (SSDs) such as solid state drives. Such devices may incorporate non-volatile memory (NVM) arrays. Examples include NAND flash drives. In an SSD-based product, a host computing device may communicate with a controller of the SSD that in turn controls access to one or more NVM arrays (e.g. NAND-based arrays) of the SSD and one or more volatile memory devices such dynamic random access memory (DRAM). At least some of the memory arrays of the SSD may be memory-mapped components that the host device can directly access by converting a virtual address within a host memory space to a physical address within the memory array using one or more page tables. (This is in contrast to block access memory components of the SSD, which may require drivers to convert a logical block address (LBA) provided by the host device into a physical memory address within the SSD memory array.)

When accessing memory-mapped components within an SSD, the host device may encounter numerous page faults. It would be desirable to configure or equip an SSD controller with components to reduce page faults in the host device.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

One embodiment of the disclosure provides a data storage apparatus that includes: a physical memory array; a mapping component configured to store values that map reference information received from a host device to physical memory addresses of the physical memory array, the reference information corresponding to virtual addresses within a memory space of the host device; an input controller configured to receive a memory access request from the host device that provides particular reference information for the mapping component; a mapping controller configured to convert the particular reference information received from the host device to a corresponding physical memory address using the mapping component; and a memory access execution controller configured to execute the memory access request by accessing the physical memory array using the physical memory address.

One embodiment of the disclosure provides a data storage apparatus that includes: a physical memory array; a mapping component configured to store values that map pointers received from a host device to physical memory addresses of the physical memory array, the pointers corresponding to virtual addresses within a memory space of the host device; and a processor configured to receive a memory access request from the host device that provides a particular pointer into the mapping component, convert the particular pointer received from the host device to a corresponding physical memory address using the mapping component, and process the memory access request on behalf of the host device by accessing the physical memory array using the physical memory address.

One embodiment of the disclosure provides a method for use by a controller for controlling access by a host device to a physical memory array. In one example, the method includes: generating a mapping table for use by the controller for storing values that map reference information received from the host device to physical memory addresses of the physical memory array, the reference information corresponding to virtual addresses within a memory space of the host device; receiving a memory access request from the host device that provides particular reference information for the mapping table of the controller; converting the particular reference information received from the host device to a corresponding physical memory address using the mapping table of the controller; and processing the memory access request by accessing the physical memory array using the physical memory address.

One embodiment of the disclosure provides an apparatus for controlling access by a host device to a physical memory array. In one example, the apparatus includes: means for configuring a mapping component of a controller to map pointers received from the host device to physical memory addresses of the physical memory array, where the pointers correspond to virtual addresses within a memory space of the host device; means inputting a memory access request from the host device that provides a particular pointer into the mapping component of the controller; means converting the particular pointer input from the host device to a corresponding physical memory address using the mapping component of the controller; and means processing the memory access request on behalf of the host device by accessing the physical memory array using the physical memory address.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

BRIEF DESCRIPTION OF THE DRAWINGS

A more particular description is included below with reference to specific embodiments illustrated in the appended drawings. Understanding that these drawings depict only certain embodiments of the disclosure and are

DETAILED DESCRIPTION

Figure 1:
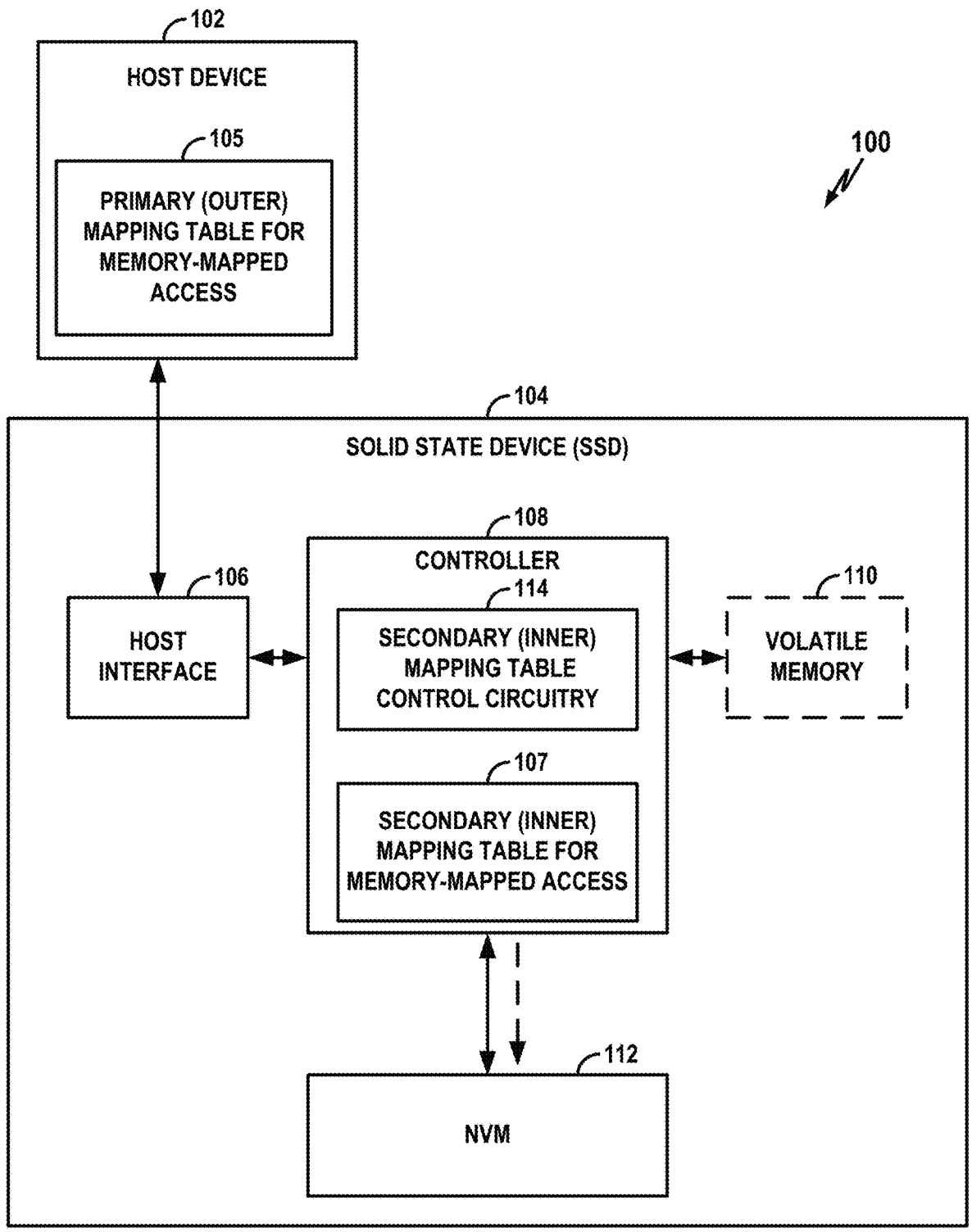
FIG. 1 illustrates an example of a memory system including a data storage device (e.g., an SSD) configured in accordance with one or more aspects of the disclosure with components to reduce, prevent or avoid page faults from being triggered in a host device.

In the following detailed description, reference is made to the accompanying drawings, which form a part thereof. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

The main examples herein relate to data storage devices or data storage apparatus for use with host devices, where the device or apparatus may be a solid state device (SSD) such as a solid state drive. In many examples, the SSD includes a non-volatile memory (NVM) array, which is one example of a physical memory array. Another example of a physical memory array within an SSD is a dynamic random access memory (DRAM).

As noted above, at least some of the memory arrays of an SSD may include components, such as memory-mapped components, that a host device can directly access by converting a virtual address to a physical address of the memory array using one or more page tables. This is in contrast to block access memory components of the SSD, which may require drivers to convert a logical block address (LBA) of the host device to a physical memory address within an SSD memory array. In many of the examples described herein, access by the host device to memory-mapped components of the SSD is performed using Peripheral Component Interconnect Express (PCIe) systems and procedures. Access by the host device to block access components is performed using NVM Express (NVMe). See, for example, the NVM Express standard, Revision 1.3a, Oct. 24, 2017. However, aspects of the embodiments described herein may be exploited in non-NVMe/PCIe controllers as well.

When accessing a memory-mapped component of an SSD, or other components that may require the conversion of a virtual address to a physical address, the host device may encounter a page fault. A page fault is a type of exception encountered by hardware processors of the host device when a program executing in the hardware processor attempts to access a memory page of a virtual memory space where the page is not currently mapped by a memory management unit (MMU) of the host device (or other similar management component). Logically, the page might be accessible to the program but the mapping may need to be added to the page tables. The MMU detects the resulting page fault. Exception handling software (often provided as part of an operating system kernel) may then handle the page fault. When handling a page fault, the operating system (OS) will usually attempt to make the required page accessible at the location in physical memory and, if that is not possible, the OS will then terminate the program to avoid an illegal memory access. If the OS is successful in making the required page accessible, the page fault is considered a "valid fault" and processing can continue once the page is accessible. If the OS is unable to make the required page accessible, perhaps because of an illegal memory access, the page fault is considered "invalid," and the program and its associated processes are terminated.

Although referred to as a "fault," many page faults are not actually errors. Rather, they are common feature of systems that utilize virtual memory as a way of increasing the amount of memory available to programs. Note that page faults may be classified as "major"/"hard" faults vs. "minor"/"soft" faults. Major faults are the type that can arise as a result of the OS increasing its amount of memory via virtual memory. That is, if a page fault arises because the page is not loaded in memory at the time of the fault, then the fault is a major/hard page fault. The handling of major page faults by the OS can require considerable processing, and hence may significantly delay the execution of the memory access command that triggered the fault, thus increasing memory access latency. For example, handling a major page fault may require one or more of an interrupt context switch, a cache flush, and a pipeline stall, as well as the loading and unloading of various registers.

It is noted that some host systems employ a hierarchy of page tables, with one table mapping a virtual address received from software into a pointer (or other suitable indicator or reference information) to another table, which in turn maps that pointer (or other suitable indicator or reference information) into the physical address of the memory component. In some systems, multiple intermediate tables are employed (e.g., a multi-level page table is implemented). The first table that receives the logical address from software might be referred to as the outer or outermost table, whereas the final table that provides the actual physical memory address might be referred to as the inner or innermost table. Ordinarily, all of these tables are maintained by the host device.

As indicated above, it would be desirable to configure a controller of a data storage device (such as an SSD) with components to prevent or at least reduce page faults in the host device. For the sake of brevity, an SSD will be used below in the description of various embodiments. It is understood that those embodiments are applicable to other forms of data storage devices as well.

At least some features described herein relate to implementing page tables so as to prevent or reduce page faults in the host device. In one aspect, an outer mapping table of a host device is configured to provide pointers (or other suitable indicators or reference information) to an inner mapping table that is maintained in and controlled by the SSD controller rather than controlled by the host device. The pointers are provided within memory access requests sent from the host to the SSD via, for example, PCIe. The inner table maps the pointers (or other suitable indicators or reference information) received from the host device to physical addresses in the SSD memory arrays. That is, rather than providing all of the mapping tables in the host device to map host virtual addresses to physical addresses, which are then used to access memory components of the SSD, an inner table of a page table hierarchy is implemented within the SSD. (In some examples herein, the inner table in the SSD is referred to as a secondary table, whereas the outer table in the host device is referred to as a primary table.) The controller of the SSD detects a page fault by, e.g., detecting if the pointer received from the host device does not correspond to an entry within its inner (secondary) table and, if such a fault is detected, the SSD allocates a physical address block to accommodate the memory access request and then executes the memory access request on behalf of the host device.

The hierarchy of page tables may include, in some examples, just the outer (primary) table maintained by the host device and the inner (secondary) table maintained in and controlled by the SSD. However, additional intermediate tables may be implemented, as well, with the intermediate tables implemented in the host. The pointers used to point from one table in the hierarchy to another table may also be referred to as virtual addresses. For example, an outer (primary) mapping table may translate a first virtual address received from software into a second virtual address that specifies an entry in the inner (secondary) mapping table. Moreover, it should be noted that, in some examples, the primary table might be located in the SSD itself (at least within its nonvolatile permanent storage) but maintained by the host.

In one aspect, a first mapping (e.g. a primary mapping in the host device of virtual addresses "owned" by the SSD, which may be a 1:1 mapping) is implemented without any pointers pointing to unmapped addresses in the SSD, and hence the first mapping triggers no page faults in the host. Rather the first mapping includes pointers that point to another table (the secondary table) that exists in, and is managed by, the SSD controller. Thus, each SSD memory access routed through the first (primary) table of the host is sent to the secondary table in the SSD. There, the access is intercepted by the SSD controller. The SSD controller checks to determine if the address is already mapped. If not, a new mapping of the address to physical memory takes place in-line in the SSD controller, and the access operation is then completed by the SSD. If appropriate, the entries in the secondary table in the SSD are updated to reflect the new mapping.

The SSD operations involving the secondary table take place without generating any exception at the host side, and so the host is not aware whether its virtual address is mapped or not, i.e. any page table faults are effectively transparent to the host. Using these procedures, the operations of the host will not be interrupted (e.g. interrupt context switches, cache flushes, pipeline stalls, register loads/unloads, etc.). By handling potential page faults within the SSD, rather than in the host, it is believed that overall memory access latency can be reduced, while freeing the host processor to perform other tasks and duties. In particular, depending upon the processing speed of the SSD, the SSD controller may handle the page fault much fast than the host device would handle the fault, and so latency can be reduced.

The disclosure thus relates in some aspects to various apparatus, systems, methods, and media for avoiding or reducing page faults arising from memory requests sent by a host device to an SSD. For example, an SSD controller may be configured to: (a) implement a mapping table within a memory of the SSD controller to map pointers (or other suitable indicators or reference information) received from the host device to physical memory addresses of the physical memory array, where the mapping table is one of a hierarchy of tables that maps virtual addresses to physical addresses within the physical memory array; (b) receive a memory access request from the host device that provides a pointer into the mapping table of the SSD controller; (c) convert the pointer received from the host device to a corresponding physical memory address using the mapping table of the SSD controller; and (d) process the memory access request by accessing the physical memory array using the physical memory address.

For the purposes of illustration, various aspects of the disclosure will be described in the context of a memory system that includes NAND memory technology. A NAND device may be referred to herein as a NAND Flash memory, a NAND memory device, a NAND flash, or a NAND. Generally speaking, a NAND device is an NVM having high storage density, fast access time, low power requirements in operation and advantageous shock resistance, compared to more conventional memory platforms. Raw NAND devices may be equipped (e.g., configured) with a serial interface such as Open NAND Flash Interface (ONFi), Common Flash Memory Interface (CFI), and the like. NAND devices may be configured as discrete memory chips or packaged with a controller to form a secure digital (SD) memory card, Multi Media Card (MMC), or a solid state disk. A NAND device may be configured with a single flash die, or a plurality of dies. In addition to memory cells, a NAND device may include other components, such as control/ address logic components, I/O components, and data register components. It should be appreciated that the teachings herein are also applicable to other forms of memory (e.g., to NVMs other than NAND devices).

Although many of the examples herein relate to SSDs that have memory-mapped components accessible by a host using, for example, PCIe, the SSDs may additionally include block access components accessible by the host using, for example, NVMe.

Example Memory System

FIG. 1 illustrates an embodiment of a memory system 100 that includes a host device 102 and an SSD 104 communicatively coupled to the host device 102. The host device (e.g., a host computer) 102 provides commands to the SSD 104 for transferring data between the host device 102 and the SSD 104. For example, the host device 102 may provide a write command or write request to the SSD 104 for writing data to the SSD 104 or a read command or read request to the SSD 104 for reading data from the SSD 104. The host device 102 may be any system or device with a compatible interface for communicating with the SSD 104. For example, the host device 102 may a computing device, a personal computer, a portable computer, or workstation, a server, a personal digital assistant, a digital camera, a digital phone, or the like. In the example of FIG. 1, the host device 102 includes an outer (primary) mapping table 105 for memory-mapped access to memory components of the SSD 104, where, as will be explained, the primary table is configured to store values that map host virtual addresses to pointers (or other suitable reference information) within a secondary (inner) mapping table 107 within the SSD 104. Note that configuring a table may involve or include such features or functions as generating and/or maintaining the table or components of the table.

The SSD 104 includes a host interface 106, a controller 108, an (optional) volatile memory 110, and an NVM 112. The host interface 106 is coupled to the controller 108 and facilitates communication between the host device 102 and the controller 108. Additionally, the controller 108 is coupled to the volatile memory 110 and the NVM 112. The host interface 106 may be any type of communication interface, such as an Integrated Drive Electronics (IDE) interface, a Universal Serial Bus (USB) interface, a Serial Peripheral (SP) interface, an Advanced Technology Attachment (ATA) interface, a Small Computer System Interface (SCSI), an IEEE 1394 (Firewire) interface, PCIe interface, or the like. In many examples herein, the host interface 106 uses PCIe for memory-mapped access to the SSD 104 and uses NVMe for block address-based access to the SSD 104. In some embodiments, the host device 102 includes the SSD 104 (e.g., the host device 102 and the SSD 104 are implemented as a single component). In other embodiments, the SSD 104 is remote with respect to the host device 102 or is contained in a remote computing system coupled in communication with the host device 102. For example, the host device 102 may communicate with the SSD 104 through a wireless communication link.

The controller 108 controls operation of the SSD 104. The controller 108 may receive commands from the host device 102 through the host interface 106 and perform the commands to transfer data between the host device 102 and the NVM 112. In addition, the controller 108 may perform internal operations such as garbage collection operations, data integrity operations, and wear leveling operations. The controller 108 may include any type of processing device, such as a microprocessor, a microcontroller, an embedded controller, a logic circuit, software, firmware, or the like, for controlling operation of the SSD 104.

In some embodiments, some or all of the functions described herein as being performed by the controller 108 may instead be performed by another element of the SSD 104. For example, the SSD 104 may include a separate microprocessor or other processing device for performing one or more of the functions described herein as being performed by the controller 108. In some embodiments, at least some functions described herein as being performed by the controller 108 are instead performed by the host device 102. In some embodiments, some or all of the functions described herein as being performed by the controller 108 may instead be performed by another element, such as a controller in a hybrid drive including both NVM elements and magnetic storage elements.

The memory 110 may be any memory, computing device, or system capable of storing data. For example, the memory 110 may be a RAM, a DRAM, a static RAM (SRAM), a synchronous DRAM (SDRAM), a flash storage, an erasable programmable read-only-memory (EPROM), an electrically erasable programmable ROM (EEPROM), or the like. In various embodiments, the controller 108 uses the memory 110, or a portion thereof, to store data during the transfer of data between the host device 102 and the NVM 112. For example, the memory 110 or a portion of the memory 110 may be a cache memory. The secondary mapping table 107 is shown in FIG. 1 as a component of the controller 108 but it should be understood that the table itself might be stored in memory 110, NVM 112, or any other suitable device or location. To reduce overall latency, it may be desirable to implement the secondary mapping table 107 within an SRAM that is a component of the controller 108. The NVM 112 may include one or more of NAND-based arrays, resistive RAM (ReRAM) arrays, a magneto-resistive random access memory (MRAM) array, and phase-change memory (PCM) arrays.

The controller 108 also includes secondary (inner) mapping table control circuitry 114 equipped, e.g., for (a) configuring the secondary table 107 to map pointers received from the host device to physical memory addresses of the NVM 112; (b) receiving a memory access request from the host device 102 that provides a pointer corresponding to an entry in the secondary table 107; (c) converting the pointer received from the host device 102 to a physical memory address of the NVM 112 using the secondary table 107; (d) processing the memory access request by accessing the NVM 112 using the physical memory address; and for (e) managing the secondary (inner) page mapping table 107.

Figure 2:
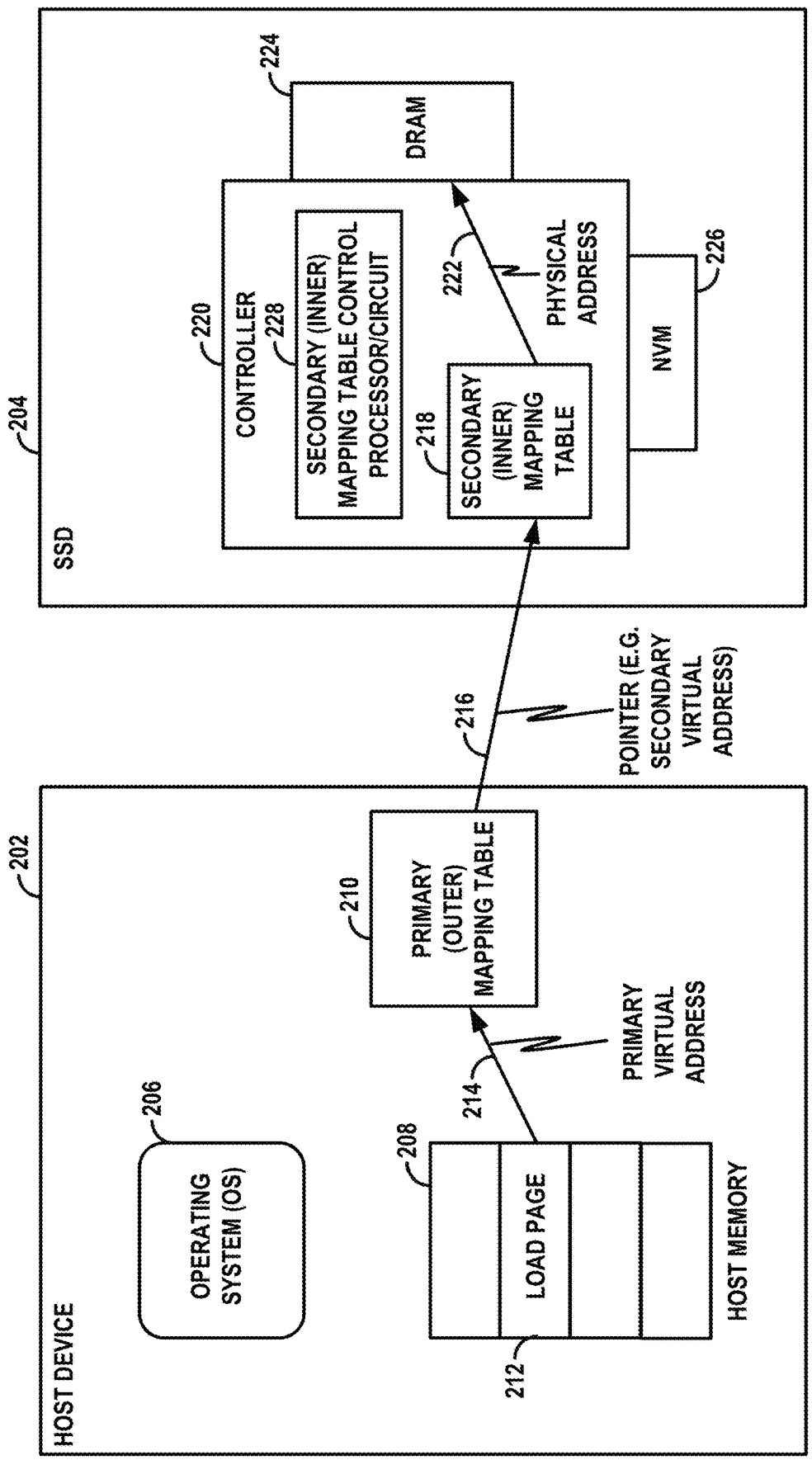
FIG. 2 illustrates another example of a memory system including a data storage device with components to reduce, prevent or avoid page faults from being triggered in a host device, and also illustrating selected features of the host device.

FIG. 2 further illustrates the use of a secondary (inner) mapping table within an SSD. A computing system 200 includes a host device 202 and an SSD 204. Selected components of the host device 202 are shown, including an OS 206, a host memory 208 and a primary (outer) mapping table 210. The host memory 208 includes a memory-mapped page 212 to be loaded. Under the control of the OS 206, the virtual address 214 of the page to be loaded (which may be referred to as a primary virtual address) is routed to the primary mapping table 210, which translates the address into a pointer 216 (which may also be referred to as a secondary virtual address). The pointer 216 is routed (via intermediate components, not shown in FIG. 2, such as a PCIe bus) to a secondary (inner) mapping table 218 within a controller 220 of the SSD 204. The pointer 216 points to an entry in the secondary mapping table 218 that provides a corresponding physical address 222. In the example of FIG. 2, the physical address 222 is a DRAM address and so the physical address 222 is routed (via intermediate components, not shown in FIG. 2, such as an internal bus) to a DRAM 224 to allow for memory-mapped access by the host to the DRAM 224. FIG. 2 also shows an NVM 226 and, in other examples, the physical address 222 might instead be routed to a memory-mapped portion of the NVM 226. A secondary (inner) mapping table control circuit or processor 228 of the controller 220 manages the secondary (inner) mapping table 218 to, for example, initially populate the table with entries corresponding to pages of a virtual memory portion of the host memory 208 and to modify those entries to, e.g., provide additional mappings to correspond to any host memory pages not initially mapped.

Thus, as shown in FIG. 2, rather than configuring page mapping tables of the host 202 to map host virtual addresses to physical addresses within a memory spaced owned by the SSD 204, the host mapping table 210 maps host virtual addresses to pointers within the secondary (inner) mapping table 218, which is maintained in, and controlled by, the SSD 204. As explained above, this may serve to prevent, or at least reduce, page faults within the host device 202 that would otherwise need to be handled by the OS 206 of the host 202 (and other fault handling components of the host device 202, not specifically shown).

Figure 3:
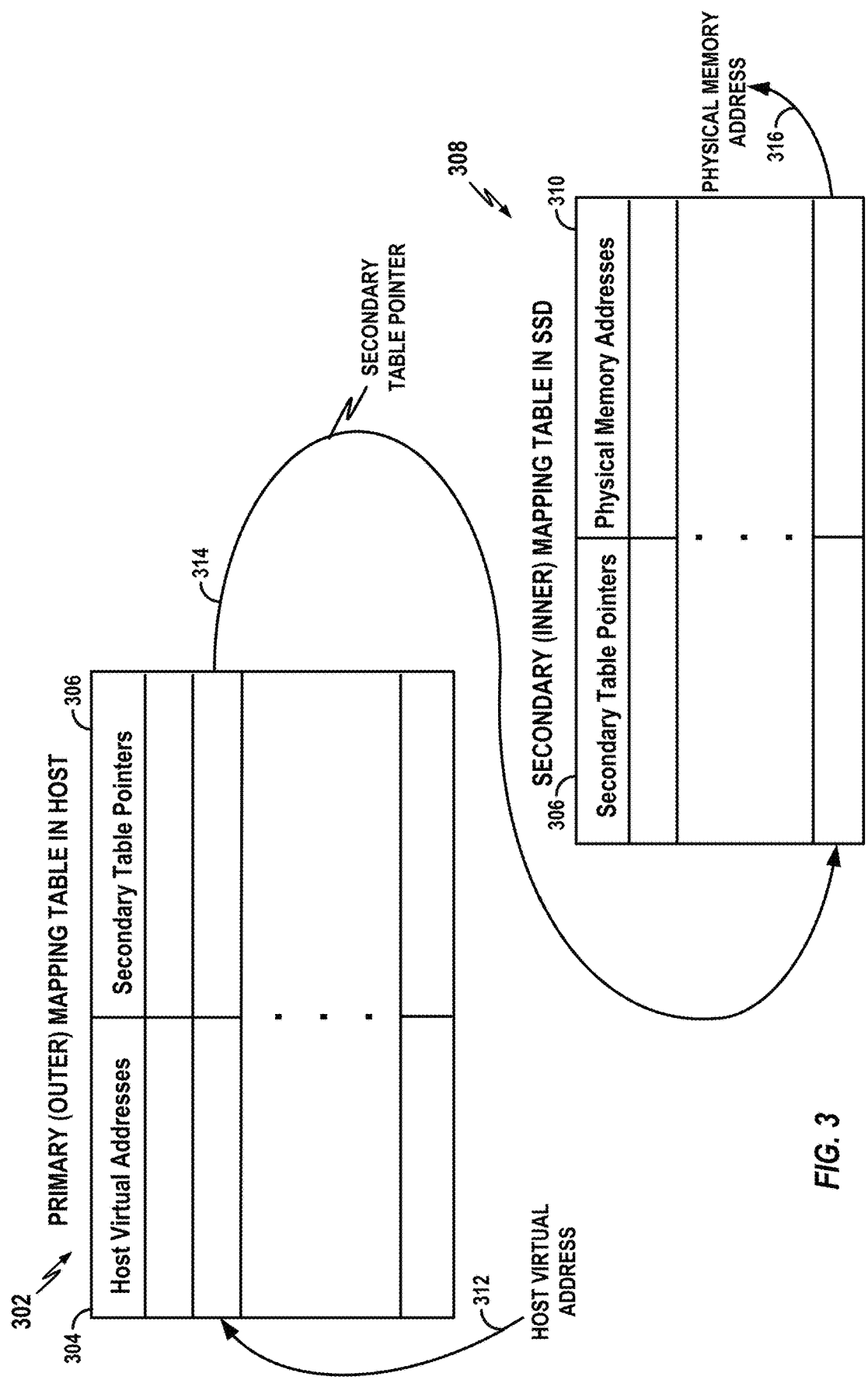
FIG. 3 illustrates exemplary primary (outer) and secondary (inner) mapping tables for use in accessing memory-mapped storage components while avoiding page faults.

FIG. 3 illustrates exemplary primary (outer) and secondary (inner) mapping tables. A primary mapping table 302 includes a set of entries each of which includes a host virtual address 304 and a corresponding secondary table pointer 306, which, as noted, may be regarded as a secondary virtual address. A secondary mapping table 308 includes a set of entries each of which includes one of the secondary table pointers 306 and a corresponding physical memory address 310, which, as noted, may refer to a memory-mapped NVM address or a memory-mapped DRAM address (or some other memory-mapped address within a memory space owned or controlled by an SSD). In the example of FIG. 3, an input host virtual address 312 is applied to the primary mapping table 302 to output a particular secondary table pointer 314, which is applied to the secondary mapping table 308 to output a corresponding particular physical memory address 316.

Figure 4:
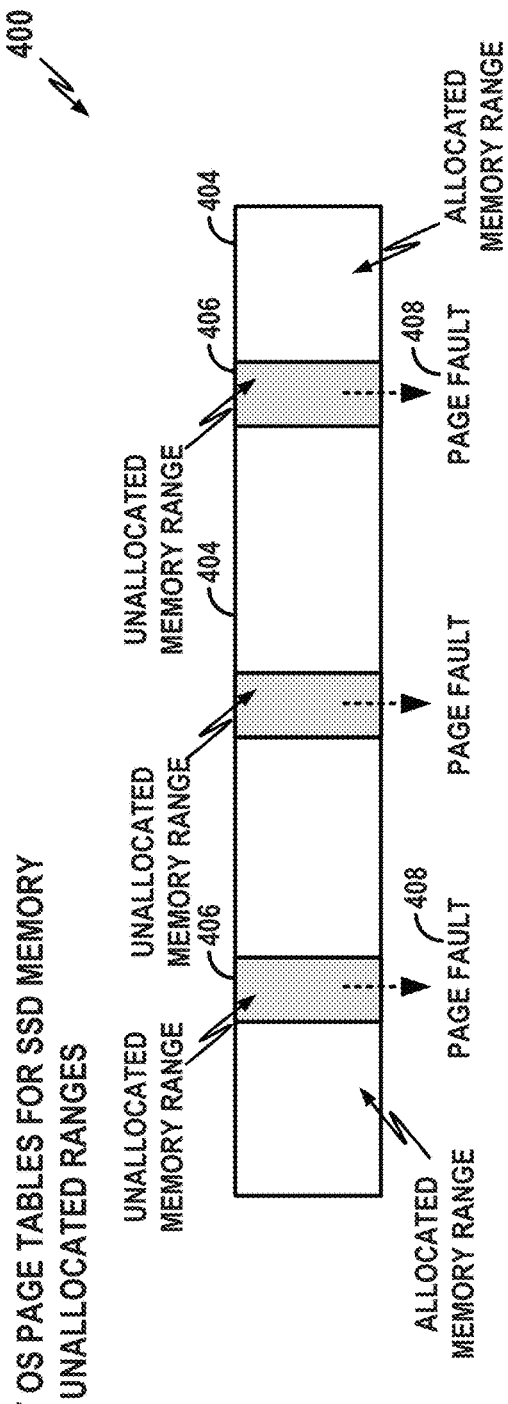
FIG. 4 illustrates example of host operating system (OS) page tables, particularly illustrating one aspect of a feature that reduces or avoids page faults in the host device.
Figure 4:
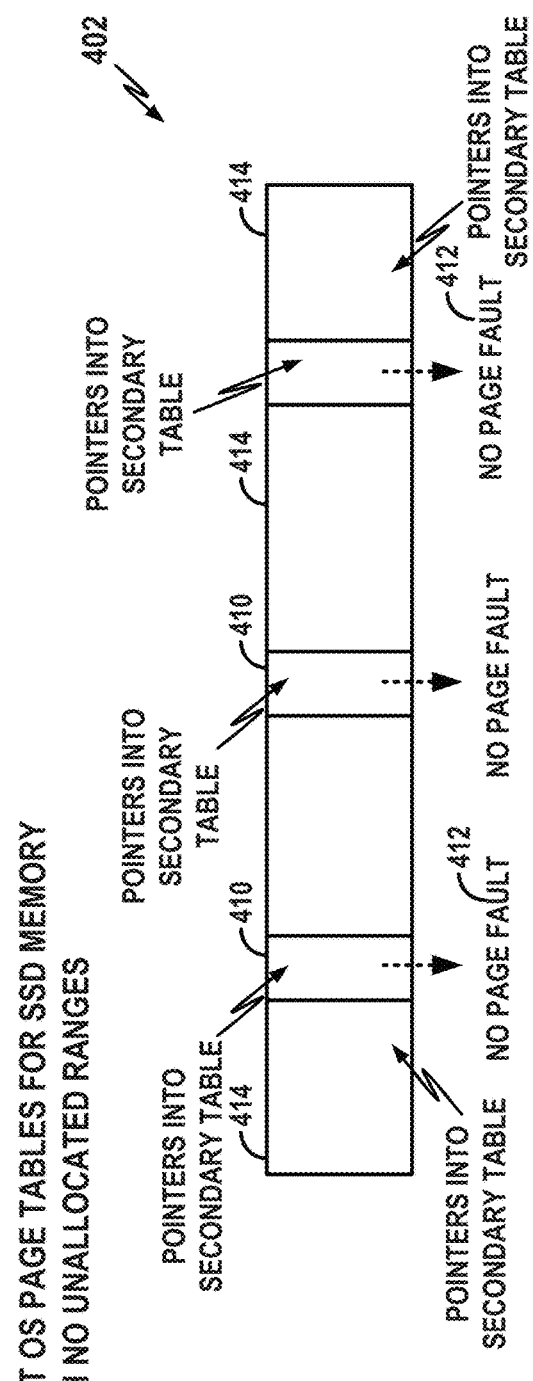

FIG. 4 illustrates exemplary host OS page tables corresponding to memory ranges associated with an SSD. A first page table 400 (which is not configured in accordance with the procedures described herein that employ a secondary table in the SSD) includes unallocated memory ranges and hence can result in page faults in the host. A second page table 402 (which is configured in accordance with the procedures described herein that employ a secondary table in the SSD) includes pointers into a secondary SSD table so that there are no unallocated memory ranges and no (or fewer) page faults in the host.

More specifically, page table 400 includes allocated portions 404 that provide physical memory address corresponding to host OS virtual addresses but also has unallocated portions 406 that provide no physical memory address corresponding to host OS virtual addresses and hence can trigger page faults 408 or other exceptions in the host when accessed. The unallocated portions of page table 400 are shown as shaded blocks in the figure to help distinguish these portions from allocated memory ranges. Page table 402 has no unallocated portions. Rather, the portions 410 that would otherwise be unallocated include pointers into the secondary table of the SSD so that they are allocated (as far as the host OS is concerned) and no host page faults are triggered (as indicated by reference numerals 412). Likewise, the portions 414 that would otherwise be allocated to provide physical memory address also include appropriate pointers into the secondary table so that these portions are still allocated and, again, no page faults are triggered. In this manner, no portions of the page table 402 of FIG. 4 are unallocated and no (or fewer) page faults occur that the host OS must handle. It should be understood that the host OS page table may also include other portions, not shown in FIG. 4, that map other virtual addresses to other physical memory addresses, such as to other physical memory components of the host device that are unrelated to the SSD. Page faults may arise in these other portions, unrelated to access to the SSD.

Figure 5:
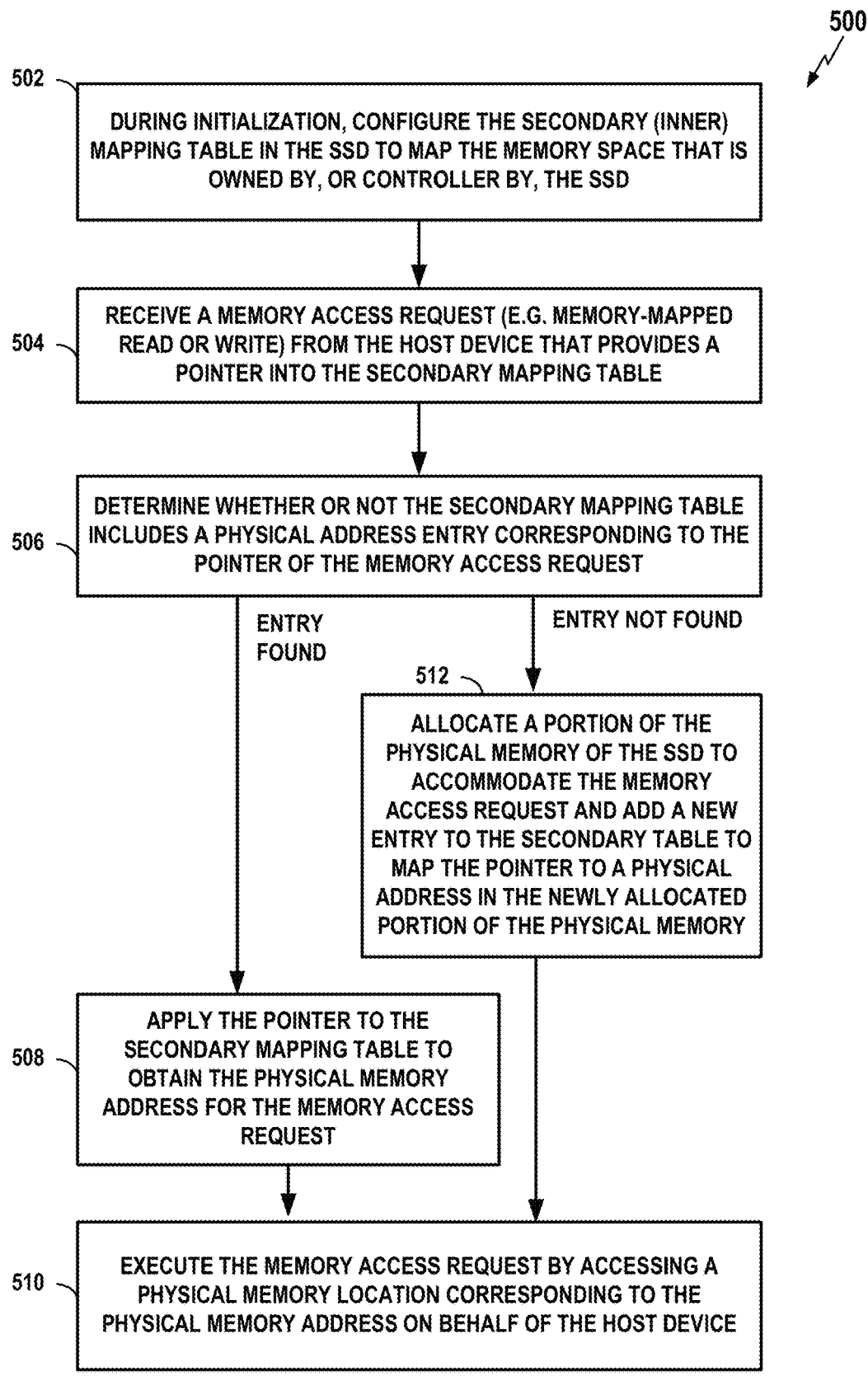
FIG. 5 illustrates an example of operations for use by an SSD controller for accessing memory using a secondary (inner) mapping table managed by the SSD controller.

FIG. 5 illustrates an embodiment of operations 500 that may be performed in conjunction with mapping tables in accordance with the teachings herein. The operations 500 may take place within an SSD or other suitable device or apparatus. For example, one or more of the operations may be performed by the controller 108 (e.g., the secondary mapping table control circuit 114) of FIG. 1. At block 502, during initialization, the controller configures the secondary (inner) mapping table in the SSD to map the memory space that is owned by, or controlled by, the SSD. This may be done, e.g., by notifying the host of the total amount of physical memory that is available for memory-mapped access. The host device initializes its page tables accordingly. The SSD then performs the same type of operations that the host device would otherwise perform in a system where the inner table of a page table hierarchy is implemented in the host memory. In some examples, the initialization of the secondary table is performed based on instructions from the host. For example, the host may indicate which portions of the SSD memory are be memory-mapped and which portions are to be block access, so that the SSD can configure its secondary table accordingly.

At block 504, the controller receives a memory access request (such as a memory-mapped read or write request) from the host device that provides a pointer into the secondary mapping table. At block 506, the controller determines whether or not the secondary mapping table already includes a physical address entry corresponding to the pointer of the memory access request. If so, then at block 506, the controller applies the pointer to the secondary mapping table to obtain the physical memory address for the memory access request. At block 510, the controller executes the memory access request by accessing a physical memory location corresponding to the physical memory address on behalf of the host device. This may involve reading data from, or writing data to, the NVM on behalf of the host.

If, at block 506, the secondary mapping table was found to not include an entry corresponding to the pointer received at block 504, i.e. a "page fault" has occurred, then, at block 512, the controller allocates a portion of the memory space of the SSD to the accommodate the memory access request and adds a new entry to the secondary mapping table to map the received pointer to a physical memory address in the newly-allocated portion of the physical memory. The operations of block 510 are then performed where the controller executes the memory access request by accessing a physical memory location allocated in block 512 on behalf of the host device.

In this manner, the "page fault" is rarely seen by the host, since it is intercepted by the SSD and handled in the SSD. It is noted that, in rare cases, the SSD might not be able to allocate memory to accommodate the access request from the host and so an error is returned to the host device, which could result in a page fault in the host. This might occur if the SSD overcommits its memory, e.g., there is less memory available in the SSD than communicated to the host device during initialization.

It should also be noted that the use of the secondary table in the SSD may be transparent to the host, i.e. the system may be configured to operate in a "transparent mode." That is, the host need not be modified to accommodate the secondary table in the SSD and need not be made aware of the existence of the secondary table. Conventionally, a host device creates its page tables based on information provided by the SSD specifying physical address ranges the host is permitted to access. The SSD provides the host with the physical address ranges of, e.g., a portion of SSD DRAM that the host is permitted to access, and the host sets up or modifies its page tables to map virtual addresses to those physical address ranges. When implementing the secondary tables described herein, the SSD instead provides the host with the physical address ranges of the memory device that stores the secondary table, and the host, in accordance with its normal procedures, uses those address ranges to configure or update its page tables. The host need not be made aware that the addresses the host is using point into the secondary table rather than directly into, e.g., DRAM or to a memory-mapped register.

Furthermore, no changes need be made to the structure or format of the memory access requests used by the host. Such requests are formatted to include one or more address values that specify one or more particular physical addresses in the SSD. The host need not be made aware that the address value the host is inserting into the memory access request is a pointer into the secondary table rather than an address in SSD DRAM, etc. Hence, the interception of the memory access requests by the SSD controller and the handling of "page faults" associated with those requests is transparent to the software, firmware and hardware of the host device and transparent to any other components coupled to the host device.

Still further, it should be noted that in a "non-transparent" mode, the host is aware of the existence of the secondary table in the SSD but is not aware of its content (specifically which entries in it are marked as allocated or not, from host perspective all entries are always allocated). Thus in the non-transparent mode, from the host's perspective address translation and final/target data access are two separate memory requests. That is, e.g., in FIG. 5, in the non-transparent mode, blocks 508 and 510 are two different operations triggered by the host. In the first operation, the host obtains the physical address, in the second operation, the host actually requests to access the target physical address after translation. In contrast, in the transparent mode, the host is not aware of the secondary mapping table in the SSD, thus the translation through the secondary table is transparent to the host. Blocks 508 and 510 are performed immediately one after the other by the SSD as a response to a single request from the host. Thus, an advantage of the transparent mode is that it reduces latency even further as blocks 508 and 510 are performed immediately one after the other, without being required to return the actual physical address to the host. That is, in the non-transparent mode, the host provides a virtual address to the SSD for translation. Both the host and the SSD treat this address as virtual. The SSD responds with the physical address, which is then used for the actual memory access. In the transparent mode, the host provides (from its perspective) a physical address to the SSD for memory access. The SSD treats the value internally as a virtual address for translation into a physical address, which is then used for the actual target access. The host is not exposed to the physical address. Thus, from the host perspective, the transparent mode operates to cut one level in the hierarchy of the mapping tables. In both the transparent mode and the non-transparent mode, page fault exceptions are avoided, as in both cases the actual allocation of the entry in the secondary page table is done transparently by the SSD and the host is not made aware of cases where entries are initially marked with "non-allocated" state.

Figure 6:
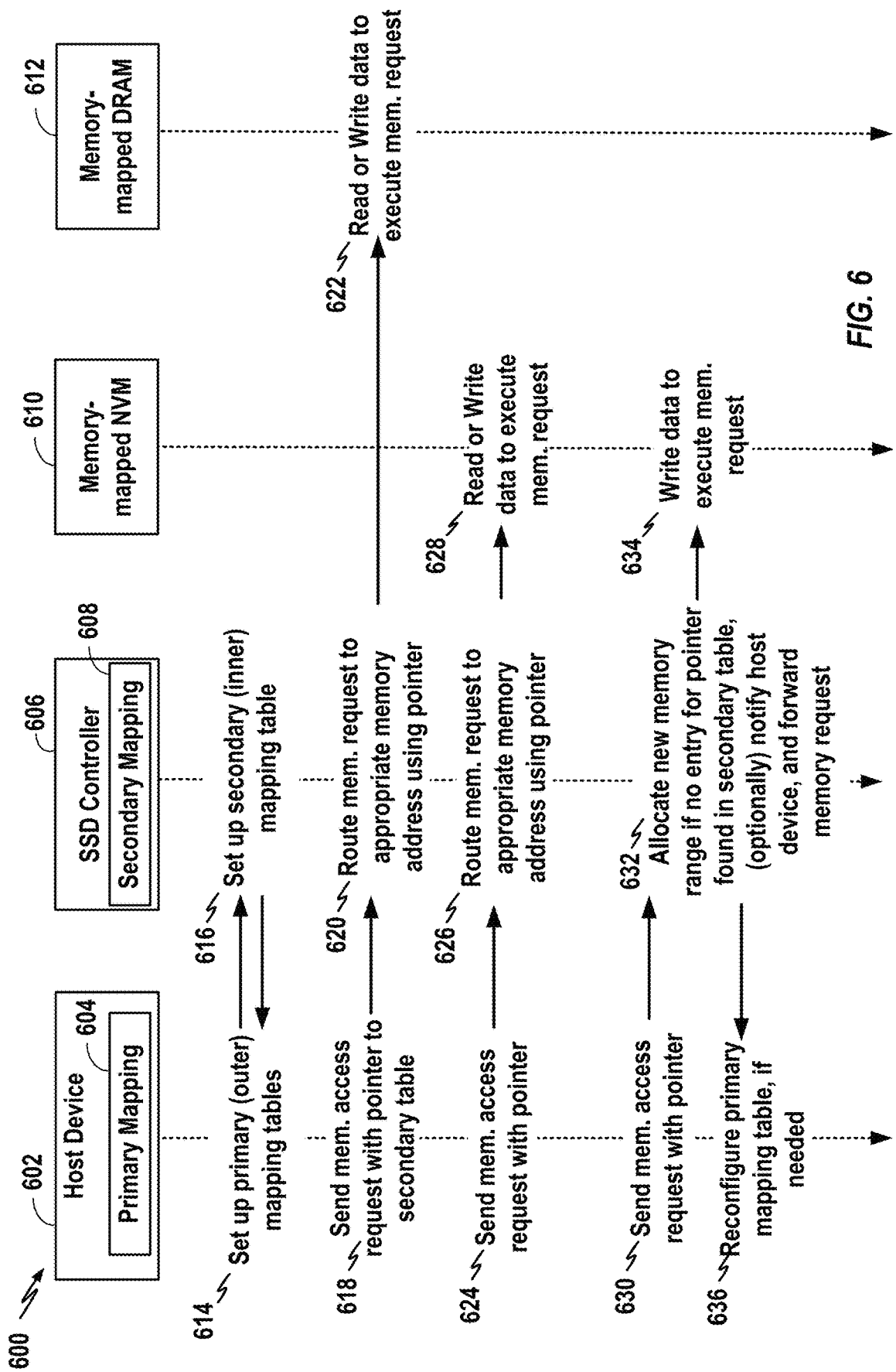
FIG. 6 illustrates exemplary operations performed by a host device and an SSD controller where the SSD controller includes a secondary (inner) mapping table.

FIG. 6 illustrates additional features of an overall system 600 that includes a host device 602 with a primary (outer) mapping table 604 (and perhaps various intermediate mapping tables), and an SSD controller 606 with a secondary (inner) mapping table 608. As shown, the system also includes a memory-mapped NVM 610 and a memory-mapped DRAM 612. Beginning in 614 and 616, the host device 602 and the SSD controller 606 set up their mapping tables during initialization when the SSD is first activated. As already explained, this may involve the SSD notifying the host of the amount of memory that the host can access, and may further involve the host notifying the SSD of the amount of memory to be allocated by the SSD for memory-mapped access as opposed to block access.

Thereafter, beginning at 618, the host device sends memory access requests to the SSD controller that may involve reads or writes to the physical memory of the SSD. Each such request includes a pointer obtained from the primary mapping table 604 into the secondary mapping table 608. The SSD controller, at 620, routes the memory request to the appropriate memory component using the pointer. In first example, the request is routed to the DRAM 612, which, at 622, reads or writes data to execute the memory request. In the second example, at 624, the host device sends another memory access request with a different pointer. At 626, the SSD controller routes the request to a memory address within the NVM 610, which responds, at 628, by performing the appropriate read or write to execute the request.

As explained above, and in some examples, a memory access request may be received by the SSD controller that is directed to a memory range not yet allocated within the memory space of the SSD. This is illustrated in FIG. 6 by way of a memory access 630, which is sent to the SSD controller, where the pointer within the memory access request does not have a corresponding entry in the secondary mapping table 608. At 632, the controller allocates a new memory range to accommodate the memory request and adds a new entry to the secondary mapping table. The SSD controller also (optionally) notifies the host device and forwards the request to the appropriate physical memory. In this particular example, the request is routed to the NVM, which, at 634, writes data to execute the memory request. At 636, the host device receives the notification from the SSD controller and reconfigures its primary mapping table (or, e.g., one of its intermediate tables), if appropriate, to accommodate the changes made to the secondary mapping table of the SSD controller. This may involve, for example, adding a new entry to the primary mapping table that corresponds to any new entries added to the secondary mapping table.

Figure 7:
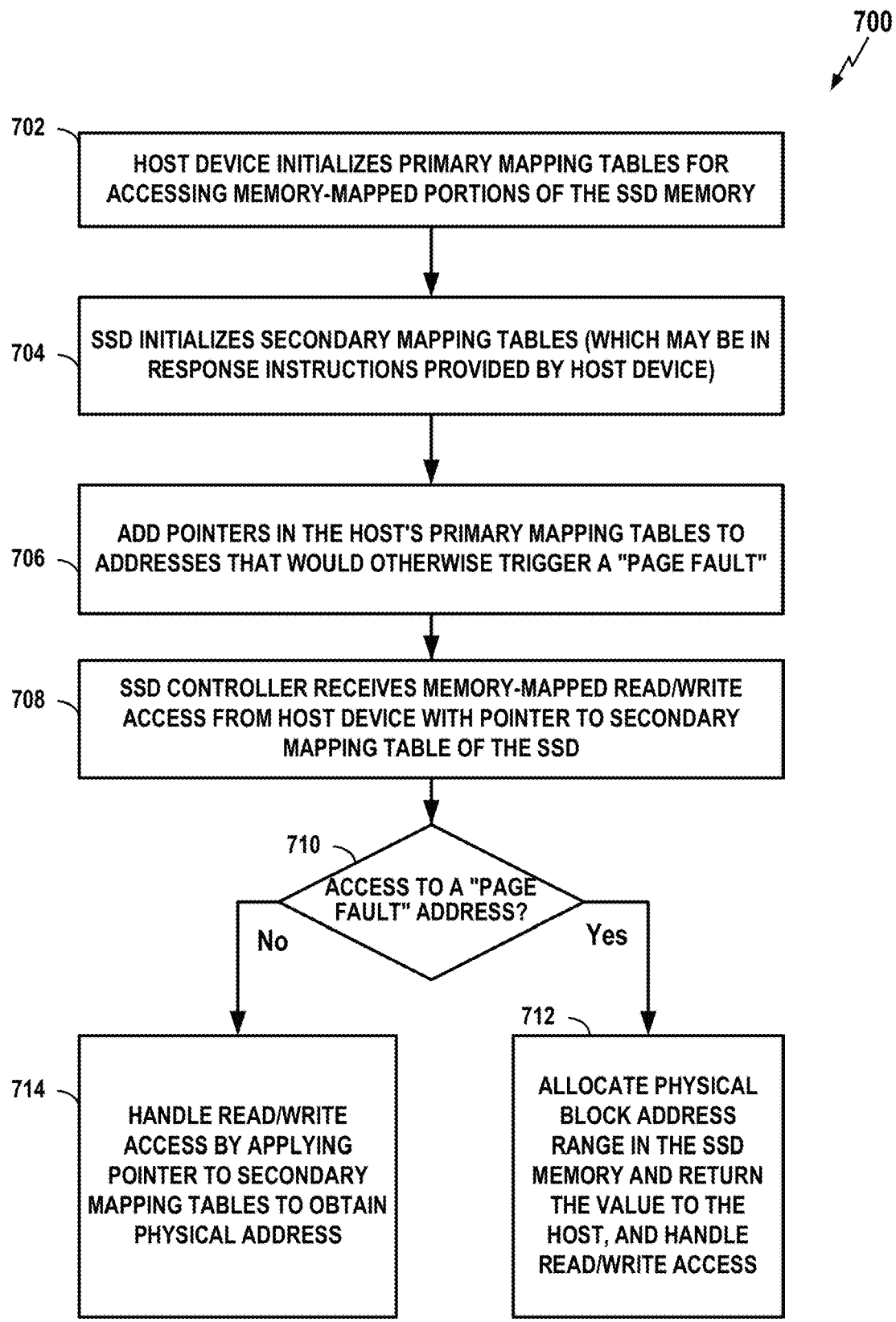
FIG. 7 provides an example of operations for use by an SSD controller and a host device for initializing various mapping tables in the host and in the SSD controller, and for accessing memory of the SSD controller using the mapping tables.

FIG. 7 illustrates still further features of an exemplary embodiment 700. At block 702, the host device initializes its primary mapping tables. This may occur during an initialization phase or procedure following activation of the SSD. At block 704, the SSD initializes its secondary mapping tables. This may be done in response to instructions provided by the host device. At block 706, the host adds pointers into its primary mapping tables for addresses that would otherwise trigger page faults. Such addresses may include ranges of addresses not yet allocated by an MMU but known by the host to correspond to the memory space associated with (e.g. controller by or owned by) the SSD. As already explained, the adding of "pointers" into the primary (page) mapping tables in the host need not require any modifications to the host. Host devices are already equipped to add address values into its page tables based on information provided by an SSD. The host need not be made aware that the address values the host is adding into its page tables are pointers into the secondary table in the SSD.

At block 708, the SSD controller receives a memory-mapped read/write access request from the host device to, e.g., write data to the physical memory of the SSD or to read data from the physical memory. The request includes a pointer to the secondary mapping table of the SSD. At decision block 710, the SSD controller determines whether the latest access is to a "page fault" address. That is, the SSD controller determines whether the received access request would trigger a page fault in the host, if not handled by the SSD, because the address of the access request is not currently allocated in the host page tables. As already explained, this determination may be made by assessing whether the secondary mapping table includes an entry corresponding to the pointer in the memory access request.

If the decision at block 710 is that a page fault would be triggered in the host if the SSD controller does not handle the page fault, then, at block 712, the SSD controller allocates a physical block address range within its memory to accommodate the memory access request and returns appropriate values to the host device so it may modify its primary mapping tables (if appropriate). Also, at block 712, the SSD controller handles the read/write access using the newly allocated physical block address range. On the other hand, if the decision at block 710 is that the memory access request will not trigger a page fault (because the memory access command includes a pointer to a valid entry within the secondary mapping tables) then, at block 714, the SSD controller handles the read/write access by applying that pointer to the secondary mapping table(s) to obtain a physical address, which is then used to access the appropriate physical address location.

Figure 8:
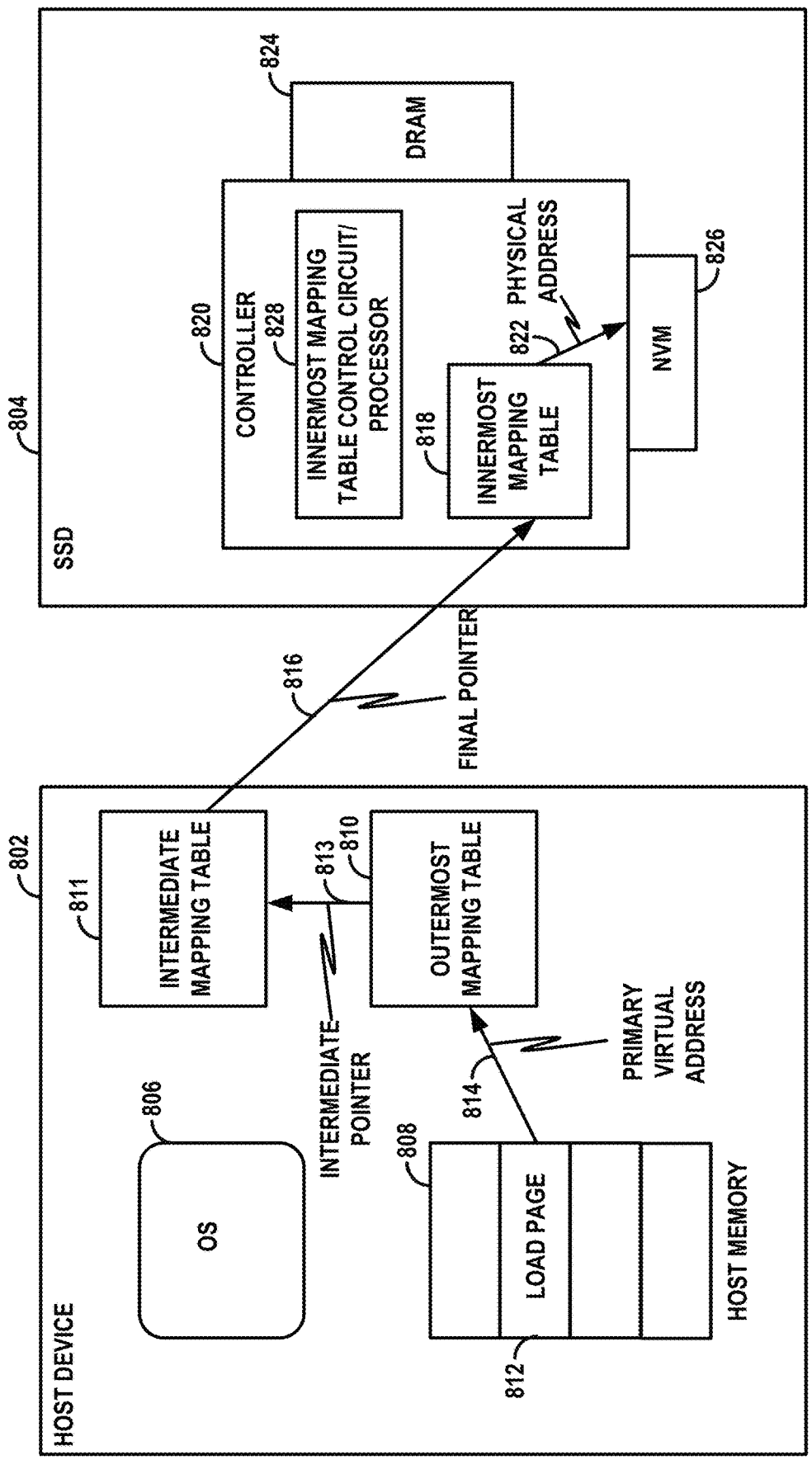
FIG. 8 illustrates another example of a memory system including a data storage device, with components to reduce, prevent or avoid page faults from being triggered in a host device, and also illustrating selected features of the host device.

FIG. 8 illustrates the use of multi-level page tables where the innermost table of a multi-level hierarchy is maintained in and controlled by an SSD. Many of the features are similar to those of FIG. 2 and will more summarized more briefly. A computing system 800 includes a host device 802 and an SSD 804 where the host device 802 includes an OS 806 and a host memory 808. The SSD 804 also includes, in this example, both an outermost mapping table 810 and an intermediate mapping table 811. Under the control of the OS 806, a (primary) virtual address 814 of a page 812 to be loaded is routed to the outermost mapping table 810, which translates or converts the address into an intermediate pointer 813 (which may also be referred to as an intermediate virtual address). The intermediate pointer 813 is routed to the intermediate mapping table 811, which translates or converts the intermediate pointer 813 into another pointer 816 (which may also be referred to as a final pointer). The final pointer 816 is routed (via intermediate components, not shown in FIG. 8, such as a PCIe bus) to an innermost mapping table 818 within a controller 820 of the SSD 804. The final pointer 816 points to an entry in the secondary mapping table 818 that provides a corresponding physical address 822. In the example of FIG. 8, the physical address 822 is an NVM address and so the physical address 822 is routed (via intermediate components, not shown in FIG. 8, such as an internal bus) to an NVM 826 to allow for memory-mapped access to the NVM 826. FIG. 8 also shows a DRAM 824 and, in other examples, the physical address 822 might instead be routed to the DRAM 824. An innermost mapping table control circuit/processor 828 of the controller 820 manages the innermost mapping table 818 using procedure already described in connections with the exemplary secondary mapping table of FIG. 2.

Exemplary NVM System

Figure 9:
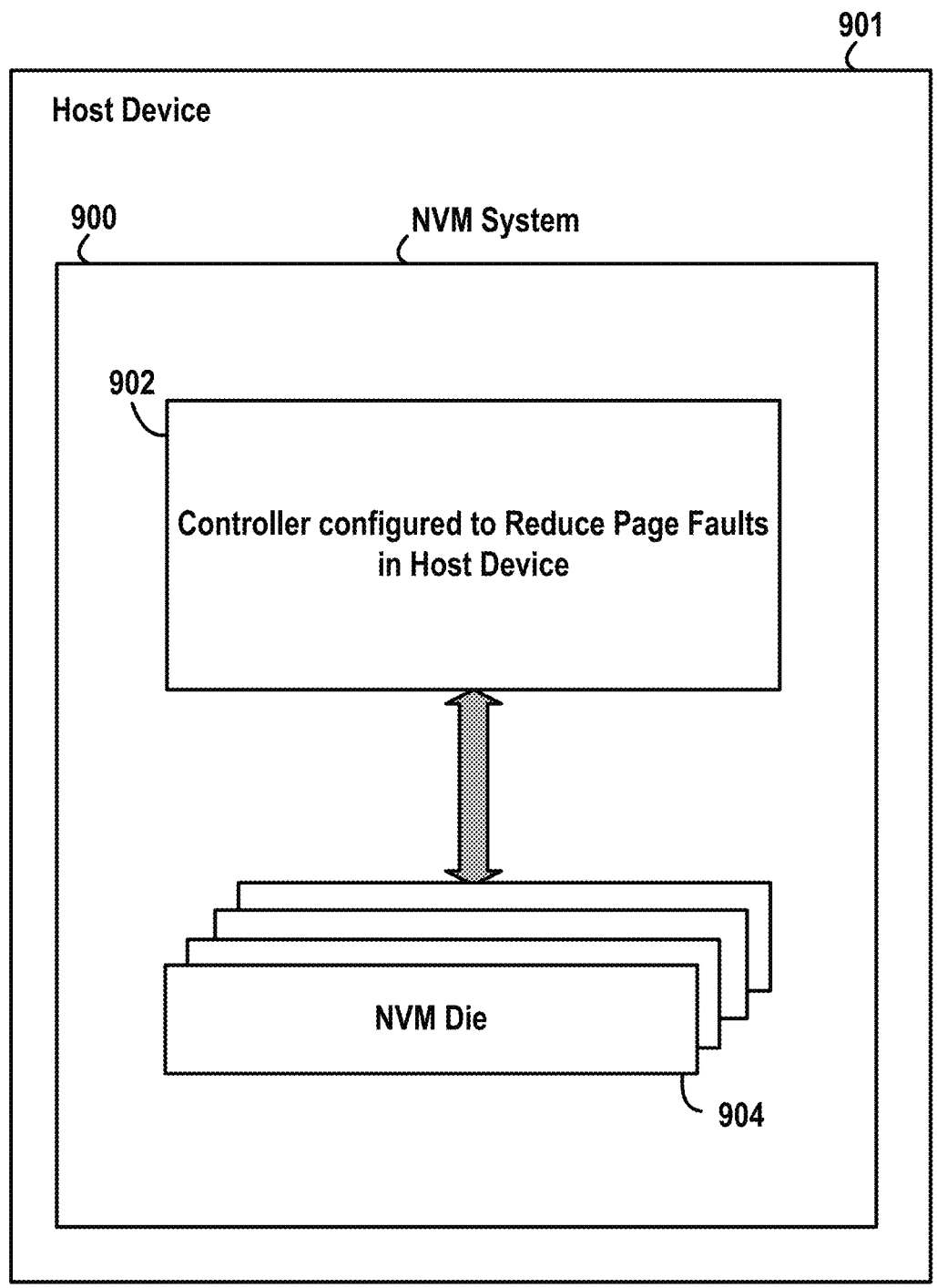
FIG. 9 is a block diagram of an exemplary NVM system having a controller configured to reduce page faults in a host device in which the NVM system is installed.
Figure 10:
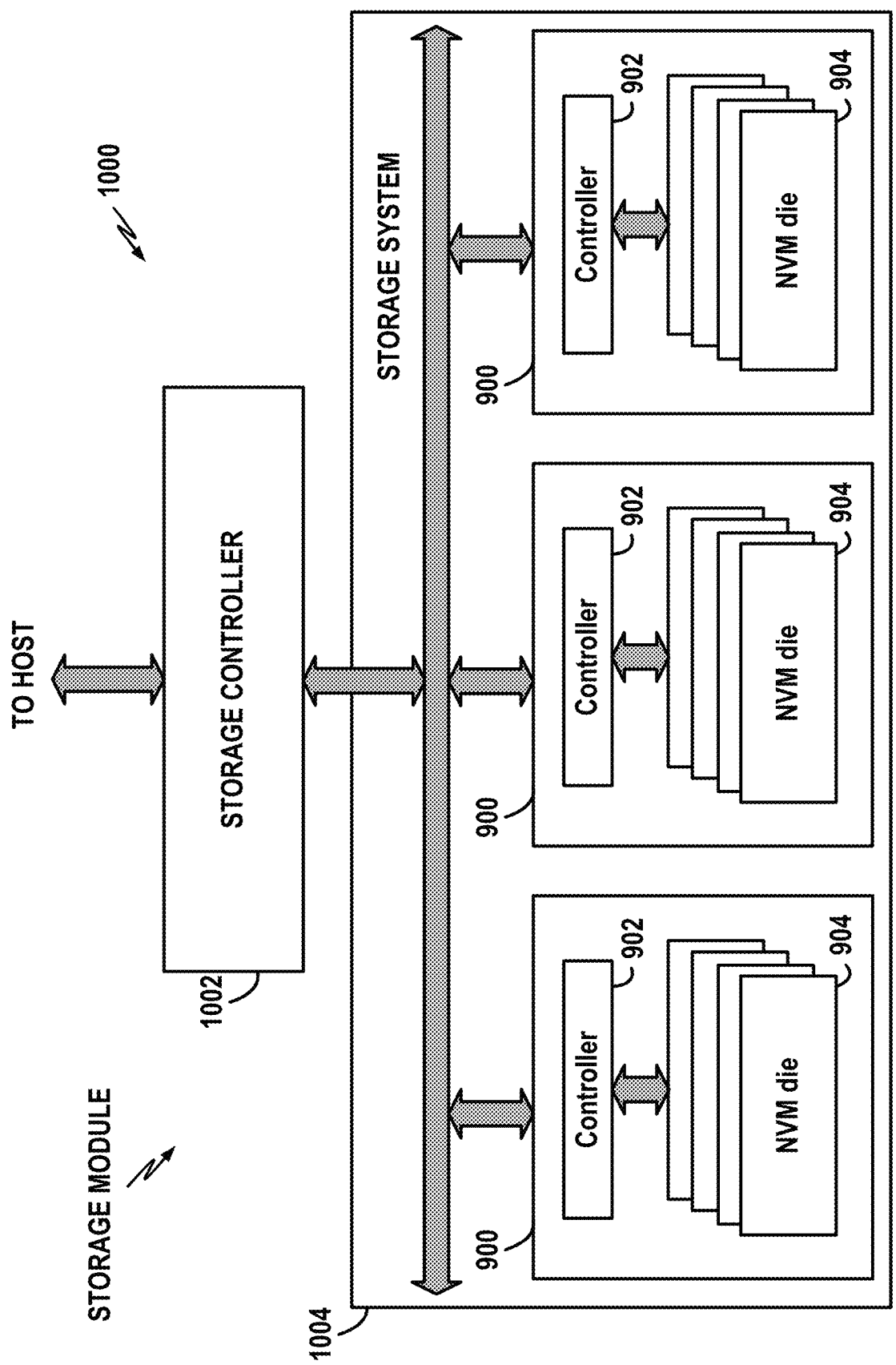
FIG. 10 is a block diagram illustrating an exemplary storage module with multiple NVM systems each having a controller as in FIG. 9.
Figure 11:
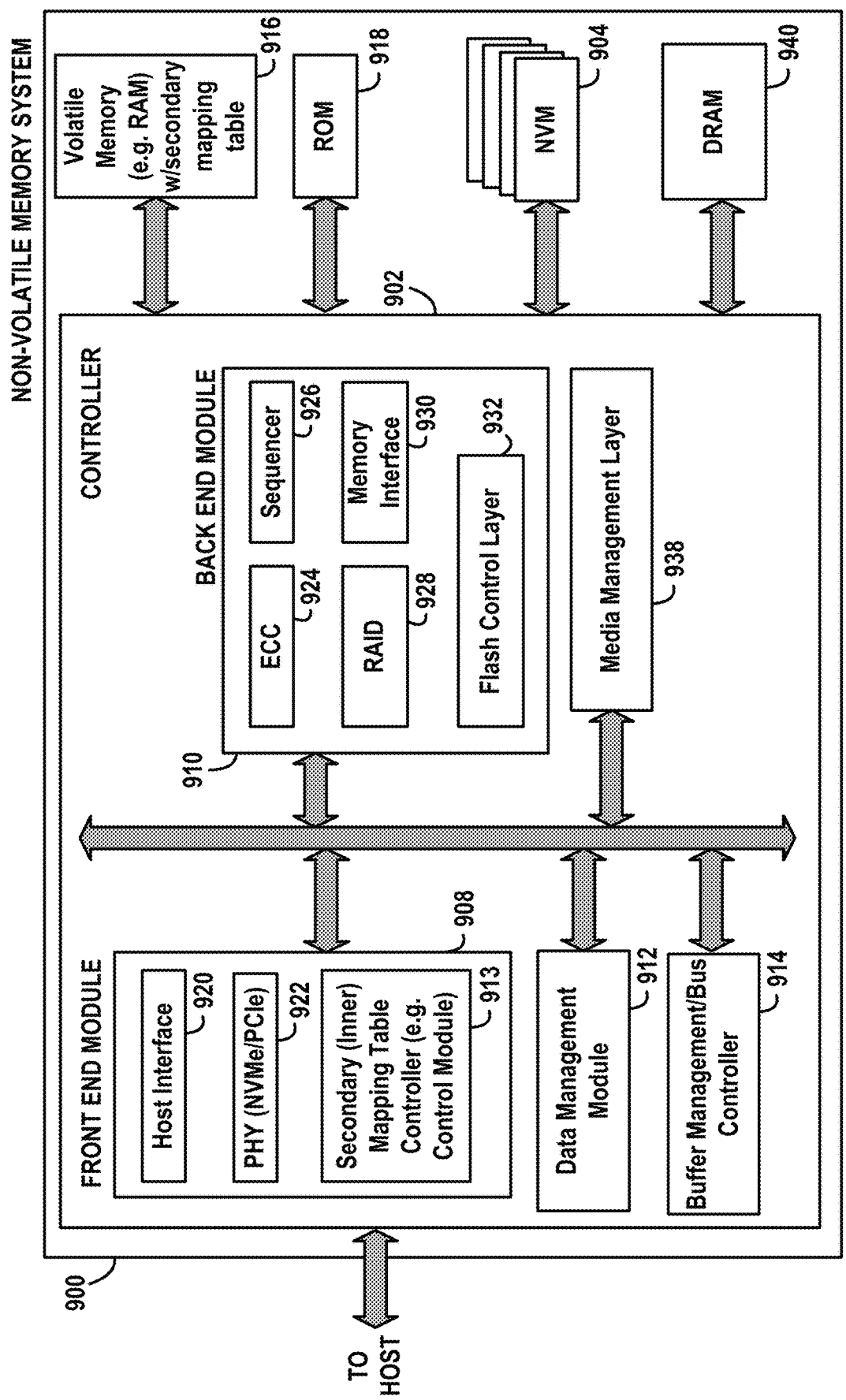
FIG. 11 is a block diagram illustrating exemplary components of the controller of the NVM system of FIG. 9.

FIGS. 9-11 illustrate and summarize various selected features of an exemplary embedded NVM system configured to implement transparent page tables.

FIG. 9 is a block diagram illustrating an exemplary NVM system 900 embedded within a host device 901, where the NVM system 900 is configured to implement one or more of the various systems and methods disclosed herein. The NVM system 900 includes a controller 902 configured to reduce page faults in the host device (by managing an inner or secondary page table within the NVM system 900), and one or more NVM dies 904. As used herein, the term die may refer to the set of NVM cells, and the associated circuitry for managing the physical operation of the NVM cells, that are formed on a single semiconductor substrate. Controller 902 interfaces with other components of the host device 901 and transmits command sequences for read, write (program), and erase operations to one or more of the NVM dies 904.

The controller 902 (which may be a flash controller) can take the form of processing circuitry, a microprocessor or processor, and/or a computer-readable medium that stores computer-readable program code (e.g., software or firmware) executable by the (micro)processor, logic gates, switches, an application specific integrated circuit (ASIC), a programmable logic controller, and an embedded microcontroller, for example. The controller 902 can be configured with hardware and/or firmware to perform the various functions described herein and shown in the flow diagrams. Also, some of the components shown herein as being internal to the controller can also be stored external to the controller, and other components can be used. Additionally, the phrase "operatively in communication with" can mean directly in communication with or indirectly (wired or wireless) in communication with through one or more components, which may or may not be shown or described herein.

As used herein, a flash controller is a device that manages data stored on flash memory and communicates with a host, such as a computer or electronic device. A flash controller can have functionality in addition to the specific functionality described herein. For example, the flash controller can format the flash memory to ensure the memory is operating properly, map bad flash memory cells, and allocate spare cells to be substituted for future failed cells. Some portion of the spare cells can be used to hold firmware to operate the flash controller and implement other features. In operation, when a host needs to read data from or write data to the flash memory, it communicates with the flash controller. If the host provides a logical address to which data is to be read/written, the flash controller converts the logical address received from the host to a physical address in the flash memory. The flash controller can also perform various memory management functions, such as wear leveling (i.e. distributing writes to avoid wearing out specific blocks of memory that would otherwise be repeatedly written to) and garbage collection (i.e. after a block is full, moving only valid pages of data to a new block, so the full block can be erased and reused).

An NVM die 904 may include any suitable non-volatile storage medium, including NAND flash memory cells and/ or NOR flash memory cells, or ReRAM or PCM cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory technologies, now known or later developed. Also, the memory cells can be arranged in a two-dimensional or three-dimensional fashion.

The interface between controller 902 and NVM die 904 may be any suitable flash interface, such as a suitable toggle mode. In the primary embodiments described herein, memory system 900 is an embedded memory system. In alternative embodiments, memory system 900 might be a card-based system, such as a secure digital (SD) or a micro secure digital (micro-SD) card. Although, in the example illustrated in FIG. 9, NVM system 900 includes a single channel between controller 902 and NVM die 904, the subject matter described herein is not limited to having a single memory channel. For example, in some NAND memory system architectures, two, four, eight or more NAND channels couple the controller and the NVM memory device, depending on controller capabilities. In any of the embodiments described herein, more than a single channel may be used between the controller and the memory die, even if a single channel is shown in the drawings. The controller 902 may be implemented in a single integrated circuit chip and may communicate with different layers of memory in the NVM die 904 over one or more command channels.

FIG. 10 illustrates a storage module 1000 that includes plural NVM systems 900. As such, storage module 1000 may include a main storage controller 1002 that interfaces with a host and with a storage system 1004, which includes a plurality of NVM systems 900. The interface between storage controller 1002 and NVM systems 900 may be a bus interface, such as a serial advanced technology attachment (SATA) or PCIe interface. Storage module 1000, in one embodiment, may be an SSD, such as flash drives found in portable computing devices, such as laptop computers, and tablet computers.

FIG. 11 is a block diagram illustrating exemplary components of controller 902 of FIG. 9 in more detail. Controller 902 includes a front end (FE) module 908 that interfaces with a host, a back end (BE) module 910 that interfaces with the one or more NVM die 904, and various other modules that perform functions, which will be described below. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example.

Modules of the controller 902 may include a data management module 912 that handles the scheduling of maintenance and host NVM write operations to balance the consumption of space with the creation of free space. In embodiments having a NVM with a plurality of NVM dies, each NVM die may be operated asynchronously and independently such that multiple NVM die may concurrently have schedule cycles balancing consumption and creation of free space in each respective NVM die. A secondary (inner) mapping table controller (e.g. control module) 913 of the FE module 908 is provided to perform or control the above-described inner page table operations involving a secondary (inner) mapping table, which may be stored, e.g., in volatile memory 916 or elsewhere in the system.

A buffer manager/bus controller 914 manages buffers in volatile memory such as in RAM 916 and controls the internal bus arbitration of controller 902. A ROM 918 stores system boot code and stores the unique device ID discussed above. A DRAM 940 may also be provided. Although illustrated in FIG. 11 as located separate from the controller 902, in other embodiments, the volatile memory 916, the ROM 918, and/or the DRAM 940 may be located within the controller. In yet other embodiments, portions of these components may be located both within the controller 902 and outside the controller 902. Further, in some implementations, the controller 902 and the various memory components may be located on separate semiconductor die.

FE module 908 also includes a host interface 920 and a physical layer interface (PHY) 922 that provide the electrical interface with the host or next level storage controller. The choice of the type of host interface 920 can depend on the type of memory being used. Examples of host interfaces 920 include, but are not limited to, SATA, SATA Express, SAS, Fibre Channel, USB, PCIe, and NVMe. As already explained, PCIe may be used for memory-mapped access, whereas NVMe may be used for block access by the host device. However, aspects described herein are applicable to other data storage systems or protocols. The host interface 920 typically facilitates transfer for data, control signals, and timing signals. Note that, although the secondary (inner) mapping table controller 913 is shown as part of the front end module 908 in FIG. 11, the secondary (inner) mapping table controller 913 (or portions thereof) might be separate from the front end module 908.

Back end module 910 includes an error correction controller (ECC) engine 924 that encodes the data bytes received from the host, and decodes and error corrects the data bytes read from the NVM. A low level command sequencer 926 generates command sequences, such as program and erase command sequences, to be transmitted to NVM die 904. A RAID (Redundant Array of Independent Drives) module 928 manages generation of RAID parity and recovery of failed data. The RAID parity may be used as an additional level of integrity protection for the data being written into the NVM die 904. In some cases, the RAID module 928 may be a part of the ECC engine 924. A memory interface 930 provides the command sequences to NVM die 904 and receives status information from NVM die 904. In one embodiment, memory interface 930 may be a double data rate (DDR) interface. A flash control layer 932 controls the overall operation of back end module 910.

Additional components of system 900 illustrated in FIG. 11 include media management layer 938, which performs wear leveling of memory cells of NVM die 904. System 900 may also include other discrete components, not specifically shown, such as external electrical interfaces, external RAM, resistors, capacitors, or other components that may interface with controller 902. In alternative embodiments, one or more of the physical layer interface 922, RAID module 928, media management layer 938, and buffer management/bus controller 914 are not necessarily provided in the controller 902.

Figure 12:
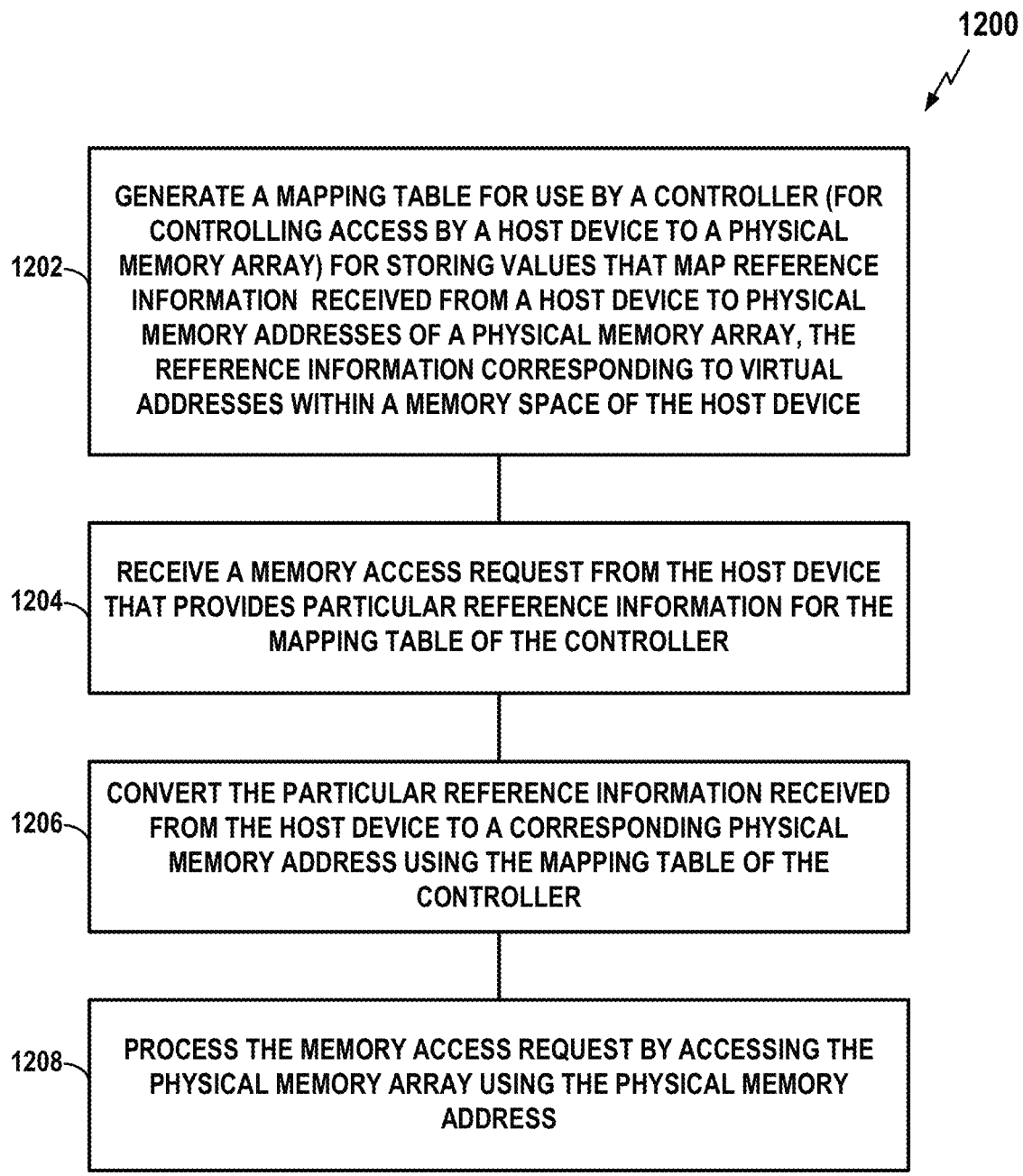
FIG. 12 illustrates a first example of a process for use by an SSD controller for controlling memory access operations using a mapping table of the SSD controller.

In the following, various general exemplary procedures and systems are described. First Example Process or Procedure FIG. 12 illustrates a process 1200 in accordance with some aspects of the disclosure. The process 1200 may take place within an apparatus such as a processor or processing circuit (e.g., the processor 228 of FIG. 2), which may be located in an SSD controller or other suitable apparatus. However, in various aspects within the scope of the disclosure, the process 1200 may be implemented by any suitable apparatus or device capable of performing the operations. At block 1202, an apparatus (e.g., a controller of an SSD) generates (or configures) a mapping table for use by a memory of the SSD controller that stores values that map reference information (such as pointers or other suitable indicators) received from the host device to physical memory addresses of the physical memory array, the reference information corresponding to virtual addresses within a memory space of the host device. It is noted that the reference information need not correspond directly to a virtual address, but maybe indirectly correspond. For instance, in examples where there are intermediate mapping tables, a pointer may correspond to an intermediate value, which in turn corresponds to the virtual address. Multiple intermediate values may link a pointer to a virtual address in the host in such a way that the pointer still "corresponds to" a virtual address in the host memory space.

Figure 13:
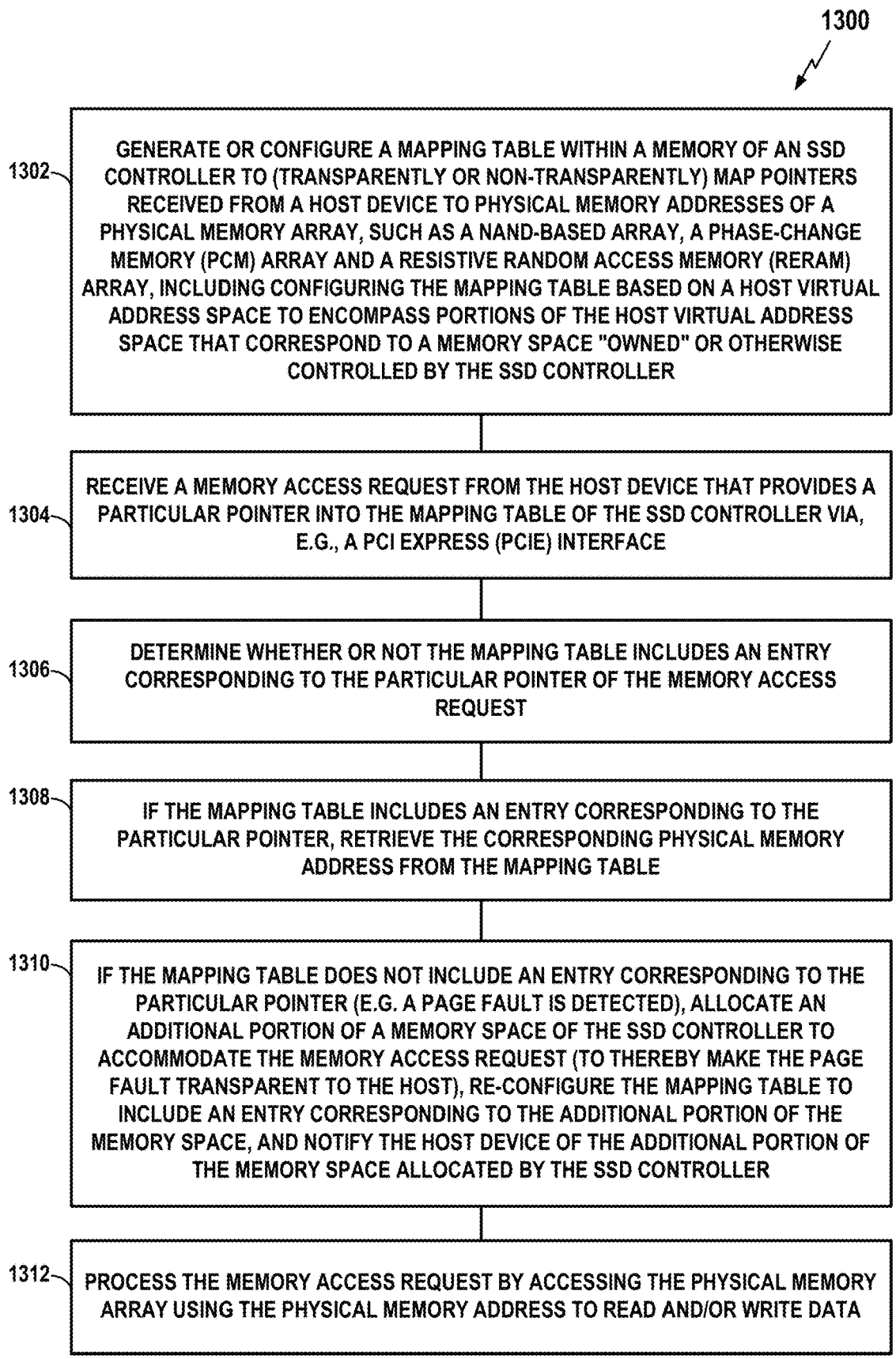
FIG. 13 illustrates a second example of a process for use by an SSD controller for controlling memory access operations using a mapping table of the SSD controller.

At block 1204, the apparatus receives a memory access request from the host device that provides particular reference information for the mapping table of the SSD controller (e.g. a pointer into the mapping table). At block 1206, the apparatus converts the particular reference information (e.g. the particular pointer) received from the host device to a corresponding physical memory address using the mapping table of the SSD controller. At block 1208, the apparatus processes the memory access request by accessing the physical memory array using the physical memory address. In some aspects, a process in accordance with the teachings herein may include any combination of the above-described operations. Second Example Process or Procedure FIG. 13 illustrates another process 1300 in accordance with some aspects of the disclosure. The process 1300 may take place within an apparatus such as a processor or processing circuit (e.g., the processor 228 of FIG. 2), which again may be located in an SSD controller or other suitable apparatus. At block 1302, an apparatus (e.g., a controller of an SSD) generates or configures a mapping table within a memory of an SSD controller to (transparently or non-transparently) map pointers received from a host device to physical memory addresses of a physical memory array, such as a NAND-based array, PCM array and a ReRAM array, including configuring the mapping table based on a host virtual address space to encompass portions of the host virtual address space that correspond to a memory space "owned" by or otherwise controlled by the SSD controller. The transparent and the non-transparent modes are discussed above, with reference to FIG. 5.

At block 1304, the apparatus receives a memory access request from the host device that provides a particular pointer into the mapping table of the SSD controller via, e.g., a PCIs interface. At block 1306, the apparatus determines whether or not the mapping table includes an entry corresponding to the particular pointer of the memory access request. At block 1308, if the mapping table includes an entry corresponding to the particular pointer, the apparatus retrieves the corresponding physical memory address from the mapping table. At block 1310, if the mapping table does not include an entry corresponding to the particular pointer (e.g. a "page fault" is detected), the apparatus: allocates an additional portion of a memory space of the SSD controller to accommodate the memory access request (to thereby make the page fault transparent to the host); re-configures the mapping table to include an entry corresponding to the additional portion of the memory space; and notifies the host device of the additional portion of the memory space allocated by the SSD controller. At block 1312, the apparatus processes the memory access request by accessing the physical memory array using the physical memory address to read and/or write data. In some aspects, a process in accordance with the teachings herein may include any combination of the above-described operations.

First Example Apparatus

Figure 14:
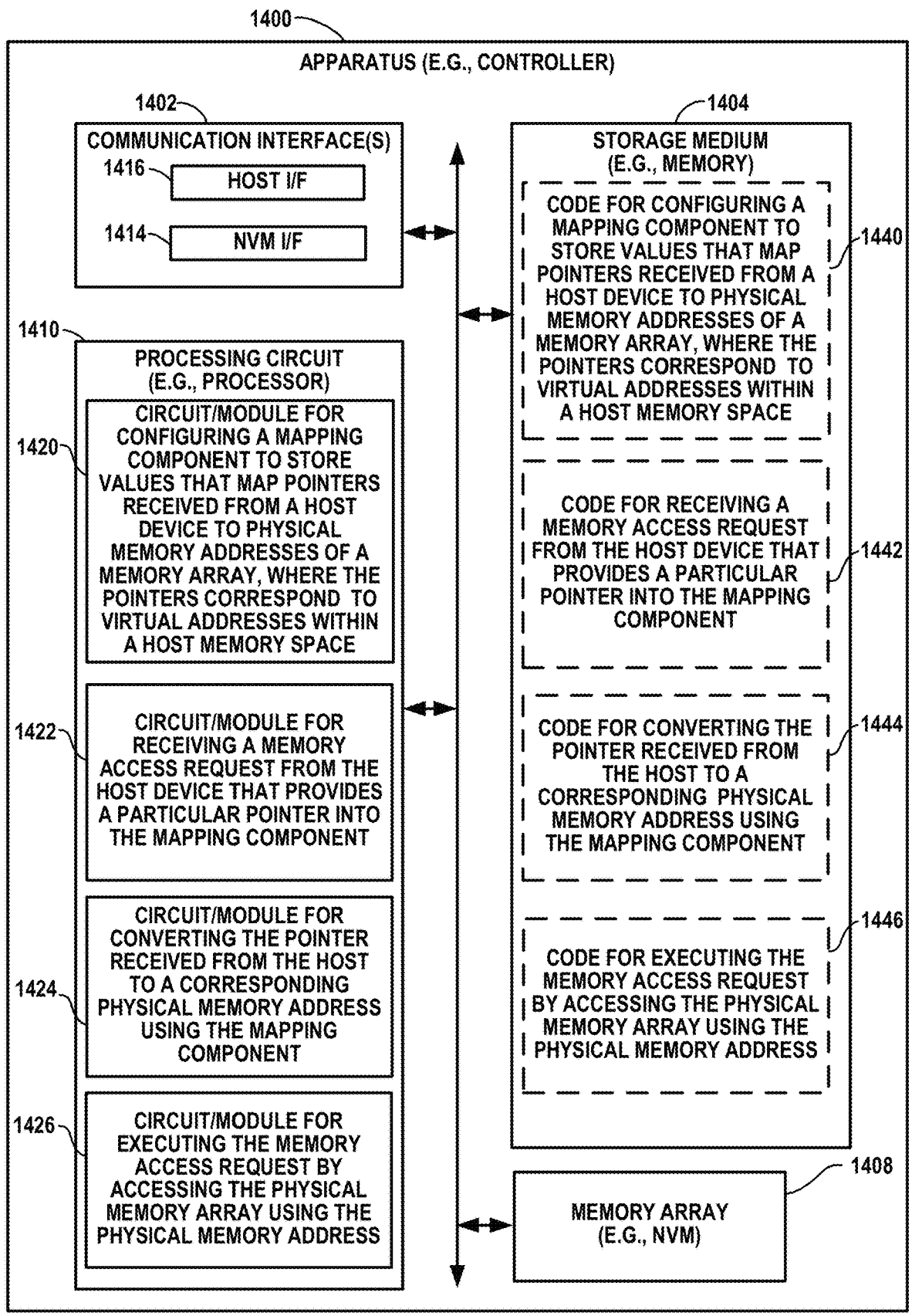
FIG. 14 illustrates a first example of a data storage apparatus (e.g., a controller), particularly highlighting exemplary components for controlling host memory access operations using a mapping table of the SSD controller.

FIG. 14 illustrates an embodiment of an apparatus 1400 configured according to one or more aspects of the disclosure. The apparatus 1400, or components thereof, could embody or be implemented within an SSD controller, a host device, an NVM device, a NAND die, or some other type of device that supports data storage. In various implementations, the apparatus 1400, or components thereof, could embody or be implemented within a computing device, a personal computer, a portable device, or workstation, a server, a personal digital assistant, a digital camera, a digital phone, an entertainment device, a medical device, or any other electronic device that stores data.

The apparatus 1400 includes a communication interface 1402, a storage medium 1404, a memory array (e.g., an NVM memory circuit) 1408, and a processing circuit 1410 (e.g., at least one processor and/or other suitable circuitry). These components can be coupled to and/or placed in electrical communication with one another via a signaling bus or other suitable component, represented generally by the connection lines in FIG. 14. The signaling bus may include any number of interconnecting buses and bridges depending on the specific application of the processing circuit 1410 and the overall design constraints. The signaling bus links together various circuits such that each of the communication interface 1402, the storage medium 1404, and the memory array 1408 are coupled to and/or in electrical communication with the processing circuit 1410. The signaling bus may also link various other circuits (not shown) such as timing sources, peripherals, voltage regulators, and power management circuits, which are well known in the art, and therefore, will not be described any further.

The communication interface 1402 provides a means for communicating with other apparatuses over a transmission medium. In some implementations, the communication interface 1402 includes circuitry and/or programming (e.g., a program) adapted to facilitate the communication of information bi-directionally with respect to one or more devices in a system. In some implementations, the communication interface 1402 may be configured for wire-based communication. For example, the communication interface 1402 could be a bus interface, a send/receive interface, or some other type of signal interface including drivers, buffers, or other circuitry for outputting and/or obtaining signals (e.g., outputting signal from and/or receiving signals into an integrated circuit). The communication interface 1402 serves as one example of a means for receiving and/or a means for transmitting.

The memory array 1408 may represent one or more memory devices. In some implementations, the memory array 1408 and the storage medium 1404 are implemented as a common memory component. The memory array 1408 may be used for storing data that is manipulated by the processing circuit 1410 or some other component of the apparatus 1400.

The storage medium 1404 may represent one or more computer-readable, machine-readable, and/or processor-readable devices for storing programming, such as processor executable code or instructions (e.g., software, firmware), electronic data, databases, or other digital information. The storage medium 1404 may also be used for storing data that is manipulated by the processing circuit 1410 when executing programming. The storage medium 1404 may be any available media that can be accessed by a general purpose or special purpose processor, including portable or fixed storage devices, optical storage devices, and various other mediums capable of storing, containing or carrying programming.

By way of example and not limitation, the storage medium 1404 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a RAM, ROM, PROM, EPROM, an EEPROM, ReRAM, a register, a removable disk, and any other suitable medium for storing software and/or instructions that may be accessed and read by a computer. The storage medium 1404 may be embodied in an article of manufacture (e.g., a computer program product). By way of example, a computer program product may include a computer-readable medium in packaging materials. In view of the above, in some implementations, the storage medium 1404 may be a non-transitory (e.g., tangible) storage medium. For example, the storage medium 1404 may be a non-transitory computer-readable medium storing computer-executable code, including code to perform operations as described herein.

The storage medium 1404 may be coupled to the processing circuit 1410 such that the processing circuit 1410 can read information from, and write information to, the storage medium 1404. That is, the storage medium 1404 can be coupled to the processing circuit 1410 so that the storage medium 1404 is at least accessible by the processing circuit 1410, including examples where at least one storage medium is integral to the processing circuit 1410 and/or examples where at least one storage medium is separate from the processing circuit 1410 (e.g., resident in the apparatus 1400, external to the apparatus 1400, distributed across multiple entities, etc.).

Programming stored by the storage medium 1404, when executed by the processing circuit 1410, causes the processing circuit 1410 to perform one or more of the various functions and/or process operations described herein. For example, the storage medium 1404 may include operations configured for regulating operations at one or more hardware blocks of the processing circuit 1410, as well as to utilize the communication interface 1402 for wireless communication utilizing their respective communication protocols.

The processing circuit 1410 is generally adapted for processing, including the execution of such programming stored on the storage medium 1404. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 1410 is arranged to obtain, process and/or send data, control data access and storage, issue commands, and control other desired operations. The processing circuit 1410 may include circuitry configured to implement desired programming provided by appropriate media in at least one example. For example, the processing circuit 1410 may be implemented as one or more processors, one or more controllers, and/or other structure configured to execute executable programming. Examples of the processing circuit 1410 may include a general purpose processor, a digital signal processor (DSP), an ASIC, a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 1410 may also be implemented as a combination of computing components, such as a combination of a controller and a microprocessor, a number of microprocessors, one or more microprocessors in conjunction with an ASIC and a microprocessor, or any other number of varying configurations. These examples of the processing circuit 1410 are for illustration and other suitable configurations within the scope of the disclosure are also contemplated.

According to one or more aspects of the disclosure, the processing circuit 1410 may be adapted to perform any or all of the features, processes, functions, operations and/or routines for any or all of the apparatuses described herein. For example, the processing circuit 1410 may be configured to perform any of the steps, functions, and/or processes described with respect to FIGS. 1-13. As used herein, the term "adapted" in relation to the processing circuit 1410 may refer to the processing circuit 1410 being one or more of configured, employed, implemented, and/or programmed to perform a particular process, function, operation and/or routine according to various features described herein. The processing circuit 1410 may be a specialized processor, such as an ASIC that serves as a means for (e.g., structure for) carrying out any one of the operations described in conjunction with FIGS. 1-13. The processing circuit 1410 serves as one example of a means for sending and/or a means for receiving. In various implementations, the processing circuit 1410 may provide and/or incorporate, at least in part, the functionality described above for the controller 108 of FIG. 1 or the controller 902 of FIGS. 9-11.

According to at least one example of the apparatus 1400, the processing circuit 1410 may include one or more of: a circuit/module 1420 for configuring a mapping component to store values that map reference information such as pointers received from a host device to physical memory addresses of a memory array, where the reference information corresponds to virtual addresses within a host memory space; a circuit/module 1422 for receiving a memory access request from the host device that provides particular reference information such as a particular pointer into the mapping table of the SSD controller; a circuit/module 1424 for converting the reference information received from the host to a corresponding physical memory address using the mapping component; and a circuit/module 1426 for executing the memory access request by accessing the physical memory array using the physical memory address.

As mentioned above, a program stored by the storage medium 1404, when executed by the processing circuit 1410, causes the processing circuit 1410 to perform one or more of the various functions and/or process operations described herein. For example, the program may cause the processing circuit 1410 to perform the various functions, steps, and/or processes described herein with respect to FIGS. 1-13 in various implementations. As shown in FIG. 14, the storage medium 1404 may include one or more of:

code 1440 for configuring a mapping component to store values that map pointers received from a host device to physical memory addresses of a memory array, where the pointers correspond to virtual addresses within a host memory space; code 1442 for receiving a memory access request from the host device that provides a particular pointer into the mapping table of the SSD controller; code 1444 for converting the pointer received from the host to a corresponding physical memory address using the mapping component; and code 1446 for executing the memory access request by accessing the physical memory array using the physical memory address In at least some examples, means may be provided for performing the functions illustrated in FIG. 14 and/or other functions illustrated or described herein. For example, the means may include one or more of: means, such as circuit/module 1420, for configuring a mapping component to map reference information (e.g. pointers) received from a host device to physical memory addresses of a memory array, where the reference information (e.g. pointers) correspond to virtual addresses within a host memory space; means, such as circuit/module 1422, for inputting or receiving a memory access request from the host device that provides particular reference information (e.g. a particular pointer) into the mapping table of the SSD controller; means, such as circuit/module 1424 for converting the reference information (e.g. pointer) received from the host to a corresponding physical memory address using the mapping component; a means, such as circuit/module 1426 for processing or executing the memory access request by accessing the physical memory array using the physical memory address.

Second Example Apparatus

Figure 15:
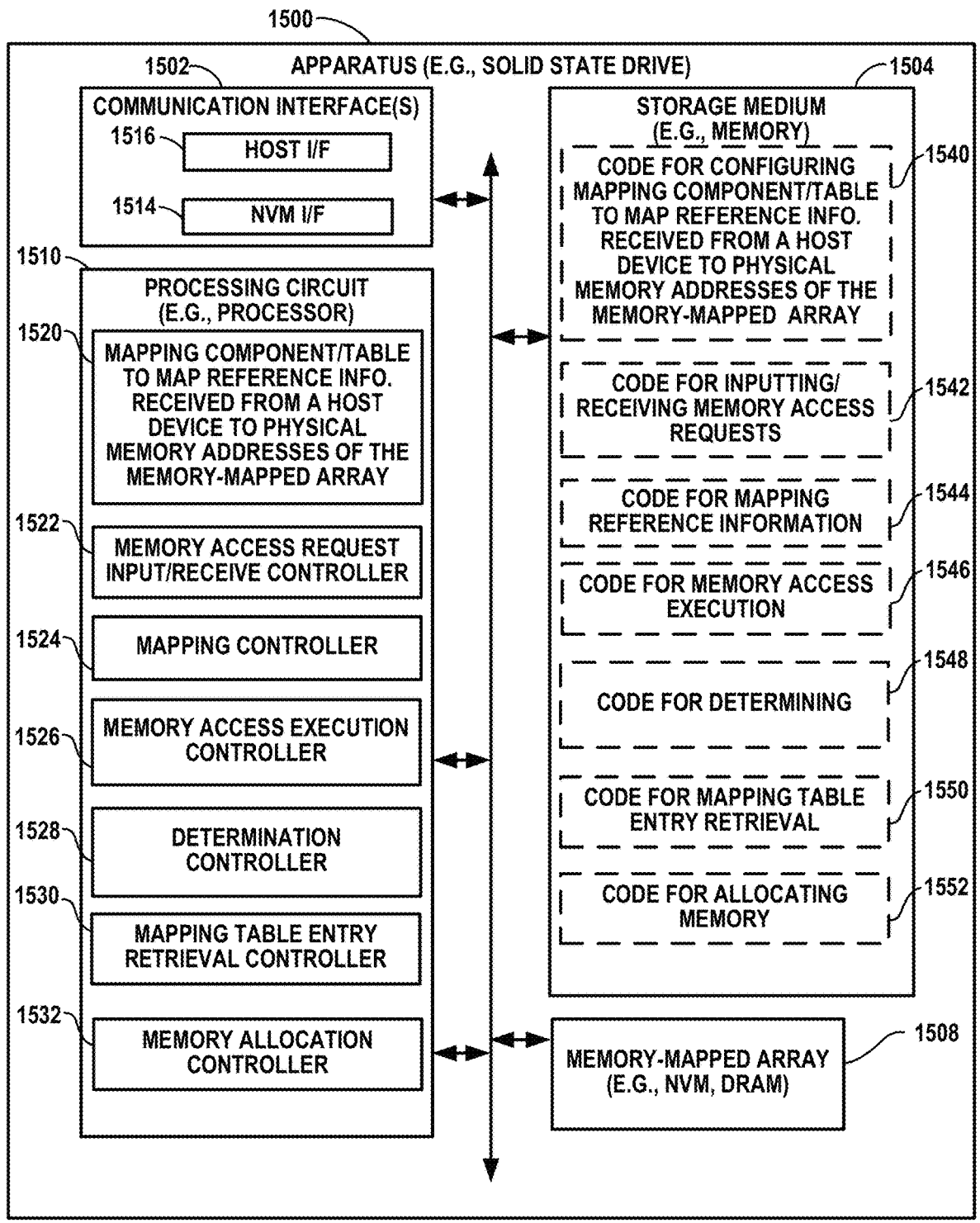
FIG. 15 illustrates a second example of a data storage apparatus, also highlighting exemplary components for controlling host memory access operations using a mapping table of the SSD controller.

FIG. 15 illustrates an embodiment of an apparatus 1500 configured according to one or more aspects of the disclosure. The apparatus 1500, or components thereof, could embody or be implemented within an SSD or some other type of device that stores data. The apparatus 1500 includes a communication interface 1502, a storage medium 1504, a user interface 1506, a memory-mapped memory array 1508 (e.g., NVM, DRAM, etc.), and a processing circuit 1510 (e.g., at least one processor and/or other suitable circuitry). The communication interface 1502 may be coupled to one or more antennas 1512, and may include a transmitter 1514 and a receiver 1516.

In general, the components of FIG. 15 may be similar to corresponding components of the apparatus 1400 of FIG. 14. The processing circuit 1510 may be adapted to perform any or all of the features, processes, functions, operations and/or routines for any or all of the apparatuses described herein. The processing circuit 1510 may be a specialized processor, such as an ASIC that serves as a means for (e.g., structure for) carrying out any one of the operations described in conjunction with FIGS. 1-13. The processing circuit 1510 serves as one example of a means for sending and/or a means for receiving. In various implementations, the processing circuit 1510 may provide and/or incorporate, at least in part, the functionality described above for the controller 108 of FIG. 1 or the controller 902 of FIGS. 9-11.

According to at least one example of the apparatus 1500, the processing circuit 1510 may include one or more of: a mapping component/table 1520 to map reference information such as pointers received from a host device to physical memory addresses of the memory-mapped array, the reference information corresponding to virtual addresses within a memory space of the host device; a memory access request input/receive controller 1522 configured to receive or input reference information such as pointers from a host device within memory access requests; a mapping controller 1524 configured to convert or translate particular reference information such as a particular pointer received from the host device to a corresponding physical memory address using the mapping component; a memory access execution controller 1526 configured to execute the memory access request by accessing the physical memory array using the physical memory address; a determination controller 1528 for determining whether or not the mapping table includes an entry corresponding to the particular reference information of the memory access request; a mapping table entry retrieval controller 1530 configured to retrieve the corresponding physical memory address from the mapping table, if the mapping table includes an entry corresponding to the particular reference information; and memory allocation controller 1532 configured to allocate an additional portion of a memory space of the SSD controller to accommodate the memory access request, if the mapping table does not include an entry corresponding to the particular reference information.

As noted, programming stored by the storage medium 1504, when executed by the processing circuit 1510, causes the processing circuit 1510 to perform one or more of the various functions and/or process operations described herein. For example, the programming may cause the processing circuit 1510 to perform the various functions, steps, and/or processes described herein with respect to FIGS. 1-13 in various implementations. As shown in FIG. 15, the storage medium 1504 may include one or more of code 1540 for configuring a mapping component/table to map reference information such as pointers received from a host device to physical memory addresses of the memory-mapped array, the reference information corresponding to virtual addresses within a memory space of the host device; code 1542 for receiving or inputting reference information such as pointers from a host device within memory access requests; code 1544 for converting or mapping particular reference information such as a particular pointer received from the host device to a corresponding physical memory address using the mapping component; code 1546 for executing the memory access request by accessing the physical memory array using the physical memory address; code 1548 for determining whether or not the mapping table includes an entry corresponding to the particular reference information of the memory access request; code 1550 for retrieving the corresponding physical memory address from the mapping table, if the mapping table includes an entry corresponding to the particular reference information; and code 1552 for allocating an additional portion of a memory space of the SSD controller to accommodate the memory access request, if the mapping table does not include an entry corresponding to the particular reference information.

In at least some examples, means may be provided for performing the functions illustrated in FIG. 15 and/or other functions illustrated or described herein. For example, the means may include one or more of: means, such as mapping component/table 1520, for mapping reference information such as pointers received from a host device to physical memory addresses of the memory-mapped array, the reference information corresponding to virtual addresses within a memory space of the host device; means, such as memory access request input/receive controller 1522, for receiving or inputting reference information from a host device within memory access requests; means, such as mapping controller 1524, for converting or translating particular reference information such as a particular pointer received from the host device to a corresponding physical memory address using the mapping component; means, such as memory access execution controller 1526, for executing the memory access request by accessing the physical memory array using the physical memory address; means, such as determination controller 1528, for determining whether or not the mapping table includes an entry corresponding to the particular reference information of the memory access request; means, such as mapping table entry retrieval controller 1530, for retrieving the corresponding physical memory address from the mapping table, if the mapping table includes an entry corresponding to the particular reference information; and means, such as memory allocation controller 1532, for allocating an additional portion of a memory space of the SSD controller to accommodate the memory access request, if the mapping table does not include an entry corresponding to the particular reference information.

Additional Aspects

The examples set forth herein are provided to illustrate certain concepts of the disclosure. The apparatus, devices, or components illustrated above may be configured to perform one or more of the methods, features, or steps described herein. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Aspects of the present disclosure have been described above with reference to schematic flowchart diagrams and/or schematic block diagrams of methods, apparatus, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

The subject matter described herein may be implemented in hardware, software, firmware, or any combination thereof. As such, the terms "function," "module," and the like as used herein may refer to hardware, which may also include software and/or firmware components, for implementing the feature being described. In one example implementation, the subject matter described herein may be implemented using a computer readable medium having stored thereon computer executable instructions that when executed by a computer (e.g., a processor) control the computer to perform the functionality described herein. Examples of computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

While the above descriptions contain many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents. Moreover, reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise.

The terminology used herein is for the purpose of describing particular aspects only and is not intended to be limiting of the aspects. As used herein, the singular forms "a," "an" and "the" are intended to include the plural forms as well (i.e., one or more), unless the context clearly indicates otherwise. An enumerated listing of items does not imply that any or all of the items are mutually exclusive and/or mutually inclusive, unless expressly specified otherwise. It will be further understood that the terms "comprises," "comprising," "includes" "including," "having," an variations thereof when used herein mean "including but not limited to" unless expressly specified otherwise. That is, these terms may specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may include one or more elements. In addition, terminology of the form "at least one of A, B, or C" or "A, B, C, or any combination thereof" used in the description or the claims means "A or B or C or any combination of these elements." For example, this terminology may include A, or B, or C, or A and B, or A and C, or A and B and C, or 2A, or 2B, or 2C, or 2A and B, and so on. As a further example, "at least one of: A, B, or C" is intended to cover A, B, C, A-B, A-C, B-C, and A-B-C, as well as multiples of the same members (e.g., any lists that include AA, BB, or CC). Likewise, "at least one of: A, B, and C" is intended to cover A, B, C, A-B, A-C, B-C, and A-B-C, as well as multiples of the same members. Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone, C alone, A and B together, A and C together, B and C together, or A, B, and C together.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

What is claimed is:

1. A method for use by a controller for controlling access by a host device to a physical memory array, the method comprising:

generating a mapping table for use by the controller for storing values that map reference information received from the host device to physical memory addresses within pages of the physical memory array within a physical memory space of the controller, the reference information corresponding to physical addresses within a separate memory space of the host device and corresponding to virtual addresses within the physical memory space of the controller, with the physical memory space of the controller transparent to the host;

receiving a memory access request from the host device that provides particular reference information for the mapping table of the controller;

converting the particular reference information received from the host device to a corresponding physical memory address within the physical memory space of the controller by using the particular reference information as a virtual address for conversion to the corresponding physical address within the physical memory space of the controller using the mapping table of the controller;

allocating one or more of the pages of the physical memory space of the controller to accommodate the memory access request and updating the mapping table, with the allocation of the one or more of the pages within the physical memory space of the controller transparent to the host device; and processing the memory access request by accessing the physical memory array using the corresponding physical memory address.

2. The method of claim 1, wherein the mapping table is one of a hierarchy of mapping tables.

3. The method of claim 1, wherein allocating the one or more of the pages of the physical memory space of the controller comprises allocating a physical address block range.

4. The method of claim 1, further comprising updating the mapping table to include additional entries corresponding to an additional portion of the physical memory space of the controller and notifying the host device to provide additional addresses within the memory space of the host device that refer to the additional entries of the mapping table of the controller.

5. The method of claim 1, wherein the reference information comprises host pointers received from a page table of the host device, and wherein converting the particular reference information comprises converting the host pointers received from the page table of the host device to corresponding physical memory addresses within the physical memory space of the controller.

6. The method of claim 5, wherein the mapping table is generated with sufficient entries so that no pointers received from the page table of the host device point to unmapped addresses.

7. The method of claim 1, wherein the reference information corresponds to memory-mapped physical addresses within the separate memory space of the host device.

8. A data storage apparatus, comprising:
a physical memory array;
a mapping table configured to store values that map reference information received from a host device to physical memory addresses within pages of the physical memory array within a physical memory space of the data storage apparatus, the reference information corresponding to physical addresses within a separate memory space of the host device and corresponding to virtual addresses within the physical memory space of the data storage apparatus, with the physical memory space of the data storage apparatus transparent to the host;

an input controller configured to receive a memory access request from the host device that provides particular reference information for the mapping table;

a mapping controller configured to convert the particular reference information received from the host device to a corresponding physical memory address within the physical memory space of the data storage apparatus by using the particular reference information as a virtual address for conversion to the corresponding physical address within the physical memory space of the data storage apparatus using the mapping table, the mapping controller including a memory allocation controller configured to allocate one or more of the pages of the physical memory space of the data storage apparatus to accommodate the memory access request and to update the mapping table, with the allocation of the one or more of the pages within the physical memory space of the data storage apparatus transparent to the host device; and a memory access execution controller configured to execute the memory access request by accessing the physical memory array using the corresponding physical memory address.

9. The data storage apparatus of claim 8, wherein the memory allocation controller is further configured to allocate the one or more of the pages of the physical memory space of the data storage apparatus by allocating one or more physical address blocks.

10. The data storage apparatus of claim 8, wherein the physical memory array comprises one or more of a non-volatile memory (NVM) and a volatile memory.

11. The data storage apparatus of claim 8, wherein the physical memory array is a non-volatile memory (NVM) comprised of one or more of a NAND-based array, a phase-change memory (PCM) array, a magneto-resistive random access memory (MRAM) array, and a resistive random access memory (ReRAM) array.

12. The data storage apparatus of claim 8, wherein the reference information comprises host pointers from a page table of the host device, and wherein the mapping controller is further configured to convert particular host pointers received from the page table of the host device to corresponding physical memory addresses within the physical memory space of the data storage apparatus.

13. The data storage apparatus of claim 12, wherein the mapping table is configured with sufficient entries so that no pointers received from the page table of the host device point to unmapped addresses.

14. The data storage apparatus of claim 8, wherein the memory allocation controller is further configured to update the mapping table without notifying the host device.

15. The data storage apparatus of claim 8, wherein the reference information corresponds to memory-mapped physical addresses within the separate memory space of the host device.

16. A data storage apparatus, comprising:
a physical memory array;
a mapping table configured to store values that map pointers received from a host device to physical memory addresses within pages of the physical memory array within a physical memory space of the data storage apparatus, the pointers corresponding to physical addresses within a separate memory space of the host device and corresponding to virtual addresses within the physical memory space of the data storage apparatus, with the physical memory space of the data storage apparatus transparent to the host; and a processor configured to
receive a memory access request from the host device that provides a particular pointer into the mapping table,
convert the particular pointer received from the host device to a corresponding physical memory address within the physical memory space of the data storage apparatus by using the particular pointer as a virtual address for conversion to the corresponding physical address within the physical memory space of the data storage apparatus using the mapping table, including allocating one or more of the pages of the physical memory space of the data storage apparatus to accommodate the memory access request and updating the mapping table, with the allocation of the one or more of the pages within the physical memory space of the data storage apparatus transparent to the host device, and
process the memory access request on behalf of the host device by accessing the physical memory array using the corresponding physical memory address.

17. The data storage apparatus of claim 16, wherein the mapping table is one of a hierarchy of mapping tables.

18. The data storage apparatus of claim 17, wherein the hierarchy of mapping tables comprises a multi-level page table.

19. The data storage apparatus of claim 16, wherein the processor is configured to allocate the one or more of the pages of the physical memory space of the data storage apparatus by allocating a physical address block.

20. The data storage apparatus of claim 16, wherein the physical memory array comprises one or more of a non-volatile memory (NVM) and a volatile memory.

21. The data storage apparatus of claim 16, wherein the pointers comprise host pointers from a page table of the host device, and wherein the processor is further configured to convert particular host pointers received from the page table of the host device to corresponding physical memory addresses within the physical memory space of the data storage apparatus.

22. The data storage apparatus of claim 21, wherein the mapping table is configured with sufficient entries so that no pointers received from the page table of the host device point to unmapped addresses.

23. The data storage apparatus of claim 16, wherein the processor is further configured to update the mapping table without notifying the host device.

24. The data storage apparatus of claim 16, wherein the pointers correspond to memory-mapped physical addresses within the separate memory space of the host device.

25. An apparatus of a data storage device for controlling access by a host device to a physical memory array of the data storage device, the apparatus comprising:
means for configuring a mapping component of a controller of the data storage device to map pointers received from the host device to physical memory addresses within pages of the physical memory array within a physical memory space of the data storage device, where the pointers correspond to physical addresses within a separate memory space of the host device and corresponding to virtual addresses within the physical memory space of the data storage device, with the physical memory space of the data storage device transparent to the host device;

means for inputting a memory access request from the host device that provides a particular pointer into the mapping component of the controller;

means for converting the particular pointer input from the host device to a corresponding physical memory address within the physical memory space of the data storage device by using the particular pointer as a virtual address for conversion to the corresponding physical address within the physical memory space of the data storage device using the mapping component of the controller, including allocating one or more of the pages of the physical memory space of the data storage device to accommodate the memory access request and updating the mapping component, with the allocation of the one or more of the pages within the physical memory space of the data storage device transparent to the host device; and means for processing the memory access request on behalf of the host device by accessing the physical memory array using the corresponding physical memory address.

* * * * *